(12) United States Patent
Russell et al.

(10) Patent No.: US 9,293,919 B2
(45) Date of Patent: Mar. 22, 2016

(54) SYSTEMS AND METHODS FOR INDUCTIVE LOAD SWITCHING

(71) Applicant: Control4 Corporation, Salt Lake City, UT (US)

(72) Inventors: James K. Russell, Salt Lake City, UT (US); David Lynn Bytheway, Salt Lake City, UT (US); William Richard Schonle, Salt Lake City, UT (US)

(73) Assignee: Control4 Corporation, Salt Lake City, UT (US)

( * ) Notice: Subject to any disclaimer, the term of this patent is extended or adjusted under 35 U.S.C. 154(b) by 292 days.

(21) Appl. No.: 13/871,319

(22) Filed: Apr. 26, 2013

(65) Prior Publication Data

US 2013/0241527 A1 Sep. 19, 2013

Related U.S. Application Data

(63) Continuation-in-part of application No. 13/598,076, filed on Aug. 29, 2012.

(60) Provisional application No. 61/528,525, filed on Aug. 29, 2011.

(51) Int. Cl.
G05F 1/455 (2006.01)
H02J 3/00 (2006.01)
H02J 3/14 (2006.01)

(52) U.S. Cl.
CPC ... H02J 3/00 (2013.01); H02J 3/14 (2013.01); H02J 2003/143 (2013.01); Y02B 70/3225 (2013.01); Y04S 20/222 (2013.01)

(58) Field of Classification Search
CPC ... H02M 1/083; H02M 5/293; H02M 5/2573; G05F 1/452; G05F 1/56; G05F 3/156; G05F 1/455

USPC .................. 323/235–241, 246, 275, 276, 285
See application file for complete search history.

(56) References Cited

U.S. PATENT DOCUMENTS 4,992,904 A 2/1991 Spencer et al.
6,671,635 B1 12/2003 Forth et al.
(Continued)

FOREIGN PATENT DOCUMENTS

EP 2 012 133 7/2009

OTHER PUBLICATIONS

Web-Mo. E-Mon D-Mon Energy Monitoring Products & Systems, Manual [online], E-Mon Corporation, 2009 [retrieved on Nov. 5, 2012], retrieved from the internet: <URL: http://web.archive.org/web/20100415112117/http://www.emon.com/techspecs/webmon_spec.pdf>, pp. 1-2.

(Continued)

*Primary Examiner* — Adolf Berhane
(74) *Attorney, Agent, or Firm* — Austin Rapp & Hardman

(57) ABSTRACT

An electronic device for inductive load switching is described. The electronic device includes a voltage sensor module that monitors a voltage waveform. The electronic device also includes a current sensor module that monitors a current waveform. The electronic device additionally includes a computing module coupled to the voltage sensor module and to the current sensor module that determines a power factor based on the voltage waveform and the current waveform. The electronic device further includes a controller module coupled to the computing module that switches off an inductive load based on the power factor. The electronic device has dimensions for fitting within a wall box.

17 Claims, 13 Drawing Sheets

(56) References Cited

U.S. PATENT DOCUMENTS

| | | | |
|---|---|---|---|
| 6,678,621 B2 | 1/2004 | Wiener et al. | |
| 7,336,463 B2 | 2/2008 | Russell et al. | |
| 7,468,877 B2 * | 12/2008 | Oki et al. | 361/93.1 |
| 2002/0077729 A1 * | 6/2002 | Anderson | 700/291 |
| 2007/0223160 A1 | 9/2007 | Coffey et al. | |
| 2008/0002439 A1 * | 1/2008 | Allinder | 363/21.01 |
| 2010/0207594 A1 | 8/2010 | Davoudi et al. | |
| 2011/0266974 A1 * | 11/2011 | Thornton et al. | 315/297 |

OTHER PUBLICATIONS

International Search Report issued for International Application No. PCT/US2012/052906 on Nov. 28, 2012.

International Preliminary Report on Patentability issued for International Application No. PCT/US2012/052906 on Mar. 13, 2014.

* cited by examiner

SYSTEMS AND METHODS FOR INDUCTIVE LOAD SWITCHING

RELATED APPLICATIONS

This application is a continuation-in-part of U.S. patent application Ser. No. 13/598,076, entitled "WALL BOX DEVICE FOR MANAGING ENERGY," filed on Aug. 29, 2012, which claims priority to U.S. Provisional Patent Application Ser. No. 61/528,525, filed Aug. 29, 2011, for "WALL BOX DEVICE FOR MANAGING ENERGY," all of which are hereby incorporated herein by reference, in their entirety.

TECHNICAL FIELD

The present disclosure relates generally to electronic devices. More specifically, the present disclosure relates to systems and methods for inductive load switching.

BACKGROUND

In recent years, the price of electrical devices has decreased dramatically. In addition, the size of electrical devices has continued to decrease. Further, electrical devices continue to increase in capability and convenience.

Decreasing prices and increasing capabilities of electrical devices has permitted modern devices to be conveniently used in homes and businesses. Many homes and businesses include multiple electrical devices to assist in everyday tasks. While these electrical devices may provide convenience and entertainment, many also require control. Moreover, these electrical devices consume electrical power. The ever-increasing cost of resources, such as electricity, may be a concern.

With more and more electrical devices being used in homes and businesses that consume more and more electrical power, improved control of electrical devices may be desirable. For example, improper control of an electrical device may result in device failures, increased costs or even hazards to a user. As illustrated by this discussion, improved control of electrical devices may be beneficial.

DETAILED DESCRIPTION

Figure 1:
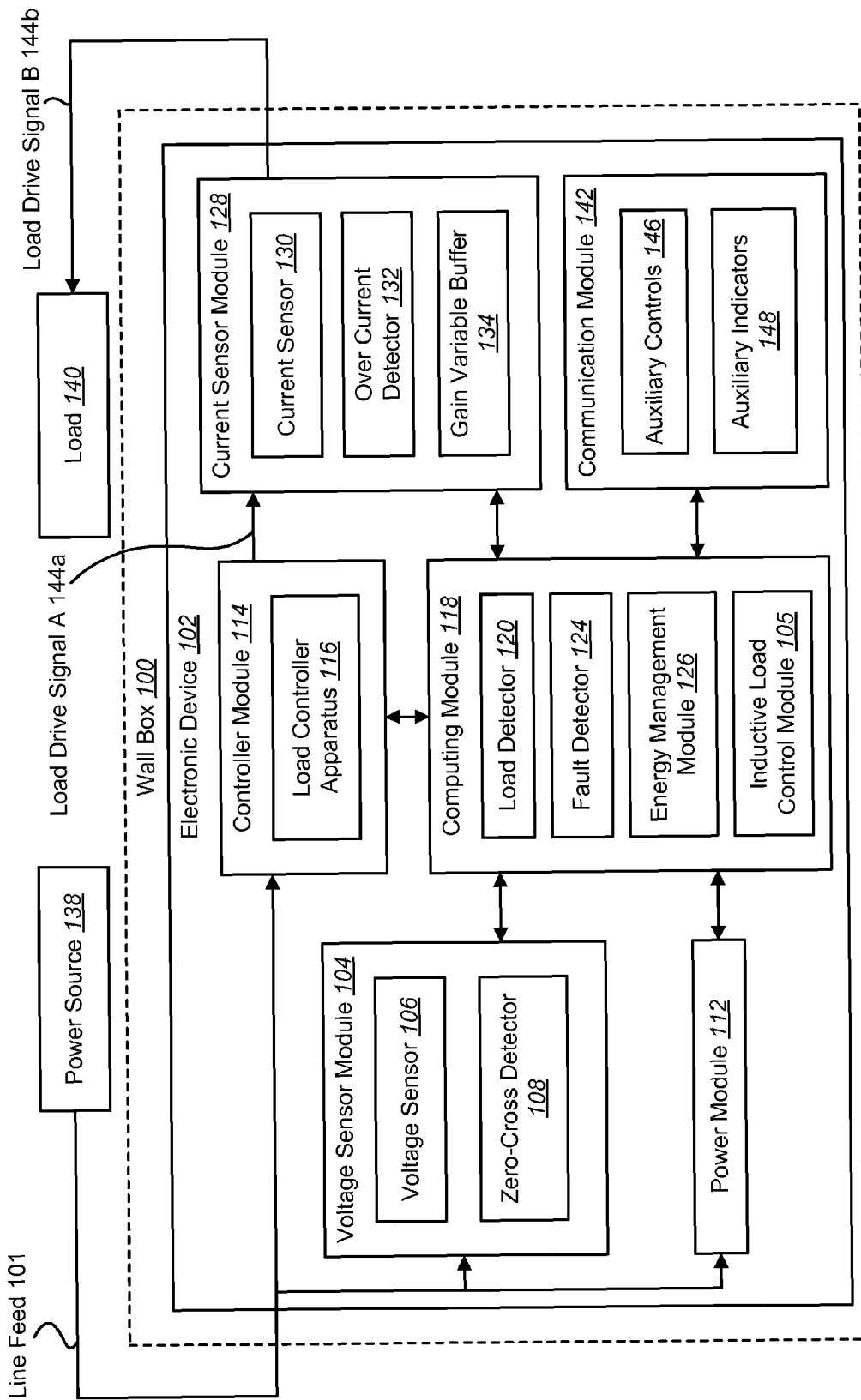
FIG. 1 is a block diagram illustrating one configuration of an electronic device for controlling a load.

An electronic device for inductive load switching is described. The electronic device includes a voltage sensor module that monitors a voltage waveform. The electronic device also includes a current sensor module that monitors a current waveform. The electronic device further includes a computing module coupled to the voltage sensor module and to the current sensor module that determines a power factor based on the voltage waveform and the current waveform. The electronic device additionally includes a controller module coupled to the computing module that switches off an inductive load based on the power factor. The electronic device has dimensions for fitting within a wall box. One or more of the voltage sensor module, current sensor module and controller module may include discrete components. The computing module may estimate a current waveform zero-cross.

The computing module may determine a switching offset based on the power factor. Switching off the inductive load may be based on the switching offset. The switching offset may indicate an amount of time to delay switching off an inductive load after a voltage zero-cross. Switching off the inductive load may include switching off a line feed in a sinusoidal fashion.

The electronic device may be wired in a switch-leg mode. The electronic device may be wired in a parallel mode.

A method for inductive load switching by an electronic device is also described. The method includes monitoring a voltage waveform. The method also includes monitoring a current waveform. The method additionally includes determining a power factor based on the voltage waveform and the current waveform. The method further includes switching off an inductive load based on the power factor. The electronic device has dimensions for fitting within a wall box.

A non-transitory tangible computer-readable medium for inductive load switching by an electronic device is also described. The computer-readable medium includes executable instructions for monitoring a voltage waveform. The computer-readable medium also includes executable instructions for monitoring a current waveform. The computer-readable medium further includes executable instructions for determining a power factor based on the voltage waveform and the current waveform. The computer-readable medium additionally includes executable instructions for switching off an inductive load based on the power factor. The electronic device has dimensions for fitting within a wall box.

The systems and methods disclosed herein describe an electronic device for inductive load switching. The electronic device may have dimensions for fitting within a wall box. For example, an electrical device (e.g., switch, dimmer, etc.) may be included within a wall box capable of controlling electrical power delivered to a load.

A wall box (e.g., electrical box, outlet box, switch box, pattress, etc.) is a container that may be used to house the body of an electrical device (e.g., light switch, power outlet) so that the face of the electrical device is flush with a wall. In some configurations, the width of a wall box may be measured in "gangs," which indicates the number of electrical devices (e.g., light switches, power outlets, etc.) that it can hold. For example, a single gang wall box can hold a single electrical device (e.g., light switch, power outlet) and a double gang wall box can hold two electrical devices (e.g., light switch, power outlet) side by side. The depth of a wall box may be standard depth, shallow depth, or deep depth. In some configurations of the systems and methods disclosed herein, a wall box is a single gang standard depth wall box. In some implementations, the electronic devices described herein may have dimensions for fitting in a wall box (e.g., a single gang standard depth wall box). Additionally or alternatively, a single electronic device described herein may be implemented to fit within a single gang of a multi-gang wall box. In some configurations, a European style wall box having a width of 86 millimeters, a height of 86 millimeters and a depth of 35 millimeters may be used. In other configurations, a United States style, single gang, standard depth wall box may be used.

A wall box switch is an electronic device with two discrete states that may be used to control a load. A wall box switch may be in an "off" state or in an "on" state. Thus, a wall box switch may turn on or off electrical power to the load. In one configuration, a wall box switch may use a relay (e.g., mechanical, solid state, etc.) to turn on or off electrical power to the load. A simple example of a wall box switch is a light switch that turns on or off electrical power to a light. The light switch may turn on the light by turning on electrical power to the light or turn off the light by turning off electrical power to the light.

A wall box dimmer is an electronic device with variable states that may be used to control a load. A wall box dimmer may variably adjust the amount of electrical power that is driven to the load (e.g., by adjusting the root mean square (RMS) voltage, adjusting pulse-width modulation, adjusting duty cycle, etc.). For example, a wall box dimmer may provide 0% electrical power, 100% electrical power or some percentage in between by adjusting a duty cycle. In one configuration, a wall box dimmer may use a semiconductor (e.g., metal-oxide-semiconductor field-effect transistor (MOSFET), triode for alternating current (TRIAC), transistors, etc.) to control the load. A simple example of a wall box dimmer is a light dimmer which may turn on or off and variably control the brightness of a light. For example, the light dimmer may increase the brightness of the light by increasing the amount of electrical power driven to the light. Similarly, the light dimmer may decrease the brightness of the light by decreasing the amount of electrical power driven to the light. In some configurations, the electronic device may include switching and dimming capabilities.

An electronic device (that may fit within a wall box, for example) may control (e.g., drive) a load. Examples of loads include lights, motors, appliances, electronic devices, etc. Examples of types of lights include incandescent, arc, gas discharge, laser, fluorescent, light emitting diode (LED), sulfur, etc. Examples of types of motors include ceiling fans, exhaust fans, pumps, etc. Examples of appliances include stoves, refrigerators, heaters, air-conditioners, etc. Examples of electronic devices include computers, televisions, game consoles, wireless devices, semiconductor devices, etc. In some configurations, the type of load may determine whether the electronic device functions as a switch and/or dimmer, depending on the capabilities of the load. A load may be characterized as one of three different types of impedances.

Practically speaking, a load includes all three types of impedances. However, in each case, one type of impedance may dominate. The different types of impedances are resistive impedance, inductive impedance and capacitive impedance. For example, motors, electronics, low voltage fans, pumps, gate openers, etc., are examples of inductive loads. Compact florescent lights and LED lights, etc., are examples of capacitive loads. Heating elements, etc., are examples of resistive loads.

An electronic device may include a voltage sensor, a current sensor and/or a zero-cross detector. The voltage sensor may capture the voltage waveform. The current sensor may capture the current waveform. The zero-cross detector may detect a zero-crossing of the voltage waveform. In some configurations, the zero-crossing may be used to align the voltage waveform and the current waveform so that a phase margin (e.g., the difference in phase or delay between the voltage waveform and the current waveform) may be determined and/or stored. The voltage waveform, current waveform and phase margin may be used for obtaining a more accurate power measurement. For example, a load that includes inductive impedance and/or capacitive impedance will cause a phase shift between the voltage waveform and the current waveform. This means that the peaks of the voltage waveform and the peaks of the current waveform will not coincide. If the voltage waveform and the current waveform are analyzed alone with this phase shift between the waveforms, then a measurement at the peak of one of the waveforms will coincide with a measurement not at a peak of the other waveform, leading to inaccurate power readings. However, if the phase margin is used along with the voltage waveform and the current waveform, then any phase shift between the waveforms may be compensated so that the peak of one of the waveforms will be analyzed with the peak of the other waveform, leading to accurate power readings. Thus, for accurate power readings, the phase margin may be used to compensate for the phase shift between the voltage and current waveforms. The voltage waveform, current waveform and phase margin may be used to accurately determine a voltage measurement in RMS volts, a current measurement in RMS current, a watts measurement, a volt-ampere measurement and a power factor measurement. The electronic device may continuously monitor the voltage waveform, current waveform and phase margin for changes in these measurements.

Knowing the voltage waveform, the current waveform and/or the phase margin may also improve energy management features. Energy management features may include the ability to perform energy measurement functions, perform load compatibility, adapt how the load is driven based on the type of the load, perform peak current fault detection, perform overload fault detection, monitor energy usage and report energy use. Additionally or alternatively, the voltage waveform and current waveform may be utilized to control certain loads in order to reduce or avoid voltage reflections from the load that may damage the electronic device.

The electronic device may perform energy measurement functions. Performing energy management functions may include determining RMS voltage, RMS current, watts, volt-amperes, true power measurements and power factor. These measurements may be determined from the voltage waveform, the current waveform and/or the phase margin. For example, the RMS voltage may be determined from the voltage waveform. Similarly, the RMS current may be determined from the current waveform. Real power in a circuit may be expressed in watts and may be determined by multiplying the voltage waveform and the current waveform while accounting for the appropriate phase margin adjustment. The apparent power in a circuit may be expressed in volt-amperes and may be found by multiplying the RMS voltage and RMS current. The power factor may be determined by determining the ratio of real power (in watts, for example) and apparent power (in volt-amperes, for example). The energy measurement functions may be performed continuously and may provide real time data.

In one configuration, the energy measurement functions of the electronic device may be supplied by sampling the voltage and current waveforms for one cycle of an alternating current (AC) signal or for one duty cycle. The electronic device may use the zero-cross signal to align the sampling of these two waveforms. Samples may then be taken and calculated and reported periodically. From these samples, it may be possible to get a voltage measurement in RMS volts, a current measurement in RMS current, a watts measurement, a volt-ampere measurement and a power factor measurement.

The electronic device may perform load compatibility. Performing load compatibility may include determining the type of load that is connected to the electronic device. The voltage waveform, the current waveform and/or the phase margin may be used to identify the type of the load being driven (e.g., the type of impedance or the proportion of each type of impedance contained in the load). In some configurations, the phase margin may be used to determine the type of load. For example, inductive loads may be characterized by the voltage waveform leading the current waveform, capacitive loads may be characterized by the current waveform leading the voltage waveform and resistive loads may be characterized by the voltage waveform and the current waveform being approximately in sync. The shape of the current waveform and/or the voltage waveform may additionally or alternatively be used to identify the type of load. For example, the harmonic components of the waveform may be analyzed to determine the type of the load. The behavior of real loads have indicated that more than a phase angle may be used to determine the type of load being driven (e.g., capacitive, inductive, resistive). The systems and methods used to capture the voltage waveform and the current waveform may maintain waveform fidelity, out to approximately the 10th harmonic, so that unusual loads (e.g., compact fluorescent, LED lighting, etc.) can be accurately measured. Moreover, the shape of the waveform and waveform fidelity (e.g., out to the 10th harmonic) may be used to identify the type of load and other load characteristics. In some configurations, a combination of multiple load detection techniques (e.g., based on the phase margin, based on the shape of the current waveform and/or the voltage waveform, etc.) may be used to determine the type of the load that is being driven.

The electronic device may adapt how the load is driven based on the type of the load. Adapting how the load is driven based on the type of the load may include adjusting the driving voltage waveform and/or current waveform to enhance efficiency and/or reduce or avoid reflections (e.g., voltage reflections, current reflections, power reflections, reflected electromotive force (EMF), etc.) from the load. For example, an electronic device may be coupled to an inductive load or impedance (e.g., a ceiling fan). In this case, the electronic device may increase its capacitive impedance to reduce the phase margin. In another example, an electronic device may be coupled to a capacitive impedance (e.g., compact fluorescent lamp). In this case, the electronic device may increase its inductance to reduce the phase margin.

In some configurations, the electronic device (e.g., a dimmer) may additionally or alternatively adjust the duty cycle and/or the amount of power delivered to the load to enhance efficiency (e.g., limiting the watts provided to correspond with the watts consumed) and/or to reduce or avoid reflections from the load. Assuming an inductive load, for example, the electronic device may switch off the inductive load (e.g., adjust the switching off point of a duty cycle) based on an estimated current waveform zero crossing. In this way, reflections from the inductive load may be reduced or avoided. Reducing reflections may reduce potential damage to the electronic device. In particular, switching off an inductive load prematurely may cause voltage reflections and/or current reflections that can damage electronic device semiconductors and/or cause unwanted heat dissipation. These reflections may damage the electronic device and/or ultimately cause the electronic device to fail. Accordingly, the systems and methods disclosed herein may provide improved inductive load switching. This may reduce reflections and accordingly preserve the electronic device and/or improve efficiency. This may also ensure compatibility between the electronic device and the load.

The systems and methods disclosed herein may be utilized to implement beneficially flexible devices that can be installed in multiple contexts. For example, known dimmers are often inherently "leading edge" dimmers (e.g., "forward phase" dimmers) or "trailing edge" dimmers (e.g., "reverse phase" dimmers) that can only be appropriately installed with certain load types (e.g., capacitive or inductive). However, the systems and methods disclosed herein provide an ability to adjust switching timing automatically (e.g., corresponding to a voltage waveform or a current waveform), which allows the electronic device (e.g., a wall box dimmer) to be installed regardless of the load type. In some configurations, one or more of the electronic devices described herein may not perform dimming utilizing Triacs for alternating current. For example, the electronic devices may perform dimming using one or more MOSFETs. MOSFETs may be capable of turning on or off any portion of an alternating current (AC) cycle. In contrast, Triacs are capable of turning on when the gate is driven, but will not turn off until voltage and current both fall to zero and the gate is disengaged.

In some configurations, the electronic device may perform peak current fault detection. Performing peak current fault detection may protect the load and/or the electronic device from large amounts of current (e.g., a short circuit, current spike, over current, etc.). For example, a large amount of current may cause a semiconductor load driver (e.g., MOSFET, TRIAC, transistor, solid state relay, etc.) and/or the wiring to overheat and self destruct. An electronic device may include fault detection circuitry (e.g., a windowed peak detector) to detect one or more fault conditions (e.g., a peak current fault) and to immediately disengage the load (e.g., turn off the electronic device, disengage the load control mechanism) if a specific fault condition (e.g., peak current) is detected. The peak fault detection circuitry may continuously monitor the current (e.g., current waveform, RMS current, peak current, etc.) passing to the load, comparing it to a preset level. If the current exceeds the preset level in either a positive direction or in a negative direction, the peak fault detection circuitry may immediately disengage the load. In one configuration, the peak fault detection circuitry sends an immediate disengage command to the semiconductor load driver. Thus, the peak fault detection circuit may disengage the load before the peak current fault causes the semiconductor load driver to self destruct.

In many cases, the peak fault detection circuitry may allow the electronic device to recover completely from a direct short circuit across the load either at power up or during operation. In some configurations, the electronic device may reset itself upon the occurrence of a peak current fault.

Some loads have a large amount of inrush current especially when they are cold (haven't been turned on for a long time). Thus, a change in the sensitivity of the peak current fault detection may be beneficial. In one configuration, the output of the current sensor may be amplified before it is passed to the peak fault detection circuit. In this configuration, a gain variable buffer may be used to change the gain of the amplifier and thus adjust the sensitivity of the peak fault detection circuit. The gain variable buffer may be used to adjust the sensitivity of the peak fault detection circuit over a continuum of sensitivity levels. The continuum of sensitivity levels may allow for the sensitivity levels to be specifically tailored to the load that is being driven. This may provide better performance in protecting both a load control device (e.g., MOSFET) and the load and wiring, which may allow a configuration (e.g., lighting) to be safer through the use of more gain values and/or time-based monitoring. For example, a specific load may have a specific inrush current and settling time specifications. The gain values may be time-based adjusted to adjust the sensitivity levels so that they track the specific inrush current and settling time specifications of the load. In some configurations, time-based monitoring may be used to adjust between multiple gain values. The sensitivity levels may be adjusted multiple times during the operation of the load to adjust for current variations (e.g., inrush current, settling time, changes in the load, etc.) In one instance, the gain variable buffer may be used to change the sensitivity of the peak fault detection circuit between two values. Thus, the value of the gain variable buffer may be set to a very low sensitivity during startup and then increased to a normal sensitivity for monitoring and energy measurement during normal running condition. For example, for a tungsten load of 500 watts, the electronic device fault detect circuit may be set for a 42 ampere trip point for the first 16 cycles of AC current during startup, and then switched to a 10 ampere trip point for normal running and energy measurement.

The electronic device may perform overload fault detection. Performing overload fault detection may protect the load and/or the electronic device from continuous current overload conditions. The electronic device may include overload fault detection circuitry to detect an overload condition and to disengage the load (e.g., turn off the electronic device). An overload condition may occur when the continuous current delivered to the load is over a set threshold for a certain length of time. For example, in one configuration, an overload circuit will disengage the load if the current delivered to the load exceeds 2.5 amperes for 10 seconds. This may protect the load and/or the electronic device from overheating and eventually failing when more wattage is being drawn than can be safely delivered.

The electronic device may manage energy usage. Managing energy usage may include monitoring energy usage and reporting energy usage. The electronic device may include energy monitoring circuitry to monitor energy usage. Monitoring and reporting energy usage may include detecting energy usage inconsistencies. In one configuration, an electronic device may detect a load and monitor the energy usage for inconsistencies. For instance, an electronic device may detect that its load is an array of compact fluorescent lamps. If the operating power is detected to be 500 watts, then the energy monitoring circuitry may report inconsistencies (e.g., burnt out light bulb, bulb malfunction, wiring malfunction, additional impedance, etc.) if the measured power changes to a different value (e.g., 400 watts, 600 watts). In another configuration, an electronic device may be implemented (e.g., programmed) so that the electronic device includes a set of specific operating parameters that are associated with the load that is being driven. For instance, an electronic device may be programmed to control a set of five 100 watt light bulbs. In this case, the electronic device will expect to measure a 500 watt load. If the electronic device measures that the load is only 400 watts, then the electronic device may report a load error. More specifically, the electronic device may report that one of the 100 watt light bulbs is not operating. If the electronic device measures that the load is 600 watts, then the wall box switch may report a load error. In this case, the electronic device may indicate a bulb malfunction, wiring error or the presence of an additional impedance in the load. In another example, an electronic device may detect a failed load controller, such as a shorted MOSFET, when the energy monitoring circuitry detects that current is flowing in the load even though the load controller is commanding a full 'OFF' condition.

In some configurations, the electronic device may report energy management values to another electronic device. The electronic device may report the full energy usage numbers. For example, the electronic device may report the actual power used. In one instance, the electronic device may report the total power use over a specified time horizon. The electronic device may additionally report the type of load, the normal operating conditions of the load, inconsistencies with the load, fault conditions of the load, etc. Reports may be made continuously, periodically and/or on demand. Reported data may be used to enhance the operation of the circuit including providing data to create better fault and overload conditions. The electronic device may additionally report to another electronic device (e.g., control system) that a fault condition has occurred. The electronic device may be reset by another electronic device (e.g., control system) as needed.

Various configurations are now described with reference to the figures, where like reference numbers may indicate functionally similar elements. The systems and methods as generally described and illustrated in the figures herein could be arranged and designed in a wide variety of different configurations. Thus, the following more detailed description of several configurations, as represented in the figures, is not intended to limit scope, as claimed, but is merely representative of the systems and methods. As used herein, the term "plurality" may indicate two or more. For example, a plurality of components refers to two or more components.

FIG. 1 is a block diagram illustrating one configuration of an electronic device 102 for controlling a load 140. The electronic device 102 may have dimensions for fitting within a wall box 100. For example, the electronic device 102 may be sized such that it 102 may be housed within a wall box 100 (e.g., single gang and standard depth). Additionally or alternatively, the electronic device 102 may include mounting (e.g., brackets, clips, fastener ports, etc.) that may be used to integrate the electronic device 102 with the wall box 100. The electronic device 102 may include a voltage sensor module 104, a current sensor module 128, a computing module 118 and a controller module 114. Arrows and/or lines may be used in one or more of the Figures herein to indicate direct or indirect couplings (e.g., direct connections and/or indirect connections through one or more elements or components). The computing module 118 may be coupled to the voltage sensor module 104 and to the current sensor module 128. The computing module 118 may be coupled to the controller module 114. In some configurations, the electronic device 102 may include a power module 112 and/or a communication module 142. The electronic device 102 may be coupled to a power source 138 and to a load 140. Examples of electronic devices 102 include electronic circuits, integrated circuits, circuits with discrete components (e.g., resistors, capacitors, inductors, transistors, etc.), devices with processors, computers, memory cells, latches, logic gates, etc. In one example, the electronic device 102 has a switch that includes discrete components and a microprocessor that may be used to control an electrical load 140 and/or manage resource consumption of an electrical load 140. In another example, the electronic device is a dimmer circuit including discrete components and a microprocessor that may be used to control an electrical load 140 and/or manage resource consumption of an electrical load 140. As used herein, a "module" may be implemented in hardware (e.g., circuitry), software, firmware or any combination thereof.

The voltage sensor module 104 may include a voltage sensor 106 that captures a voltage waveform. For example, the voltage sensor module 104 may continuously capture (e.g., measure) the voltage waveform by sampling the line feed 101 provided by the power source 138. The line feed 101 may provide an alternating current (AC) signal or AC power, for example. The voltage waveform may indicate how the voltage varies over each cycle of the AC signal. In some configurations, the electronic device 102 (e.g., voltage sensor 106) may provide analog voltage measurements to an analog to digital (A/D) converter to convert analog voltage measurements to digital samples (e.g., quantized samples that represent voltage measurements). For example, the A/D converter may sample at discrete intervals to capture how the voltage varies over time (e.g., one or more cycles of the AC signal). In some configurations, the line feed 101 may correspond to the hot feed of mains electricity. The voltage sensor module 104 may include discrete components. In some configurations, the voltage sensor module 104 may only include discrete components.

In some configurations, the voltage sensor module 104 may additionally include a zero-cross detector 108. In other configurations, the zero-cross detector 108 may be separate from the voltage sensor module 104 and/or the voltage sensor 106. The zero-cross detector 108 may be used to determine the zero crossings of an AC signal provided by the line feed 101. For example, the zero-cross detector 108 may indicate when the voltage of the AC signal switches polarity. In some configurations, the zero-cross detector 108 may be used to align the sampling of the voltage waveform and the current waveform. For example, the samplings of the voltage sensor 106 and the samplings of the current sensor 130 may be aligned with reference to time so that a phase margin between the voltage waveform and the current waveform may be determined.

The zero-cross detector 108 may additionally be used to determine the AC power frequency of a power source 138. For example, the zero-cross detector 108 may indicate an AC signal frequency of the power source 138. For instance, the zero-crossings of the AC signal may typically occur within a range of 45 to 65 Hertz (Hz) (where approximately 60 Hz is a typical AC power frequency in the United States and approximately 50 Hertz is a typical AC power frequency in Europe and parts of the Pacific Rim, for example). The electronic device 102 may automatically adjust for frequency differences based on the AC power frequency of the system. For instance, the duty cycle required to illuminate a light bulb at 50% brightness may be higher in a 50 Hz system than it may be in a 60 Hz system.

The current sensor module 128 may include one or more of a current sensor 130, an over current detector 132 and a gain variable buffer 134. In some configurations, the current sensor 130, gain variable buffer 134 and/or over current detector 132 may share discrete components (e.g., resistors, capacitors, transistors, amplifiers, chip packages, etc.) in performing respective functions of the current sensor module 128. In some implementations, the over current detector 132 may be included within the current sensor 130. In other implementations, the current sensor 130 may be included within the over-current detector 132. The current sensor module 128 may include discrete components. In some configurations, the current sensor module 128 may only include discrete components.

The current sensor module 128 may capture (e.g., measure) the current waveform by sampling load drive signal A 144a provided by the controller module 114. For example, the current sensor 130 may capture (e.g., measure) a continuous time current waveform of load drive signal A 144a. The continuous time current waveform may indicate how the current varies over each duty cycle of load drive signal A 144a. In particular, load drive signal A 144a may be a signal produced by the controller module 114 for driving the load 140. The current sensor module 128 may provide load drive signal B 144b, which may be a load drive output from the electronic device 102 to the load 140. It should be noted that load drive signal B 144b may be similar to load drive signal A 144a, although the current sensor module 128 may utilize a load (e.g., a sense resistor) to measure the current, which may modify load drive signal A 144a to produce load drive signal B 144b.

The gain variable buffer 134 may amplify the analog current waveform based on an appropriate gain. For example, the current sensor 130 may capture a current waveform with a very small magnitude. In this case, the captured continuous time current waveform may need to be amplified before further processing. The gain of the amplifier may change the magnitude of the continuous time current waveform. In one configuration, the gain of the gain variable buffer 134 may be adjusted dynamically. For example, two or more gain values may be applied dynamically. In one instance, a gain may be set to a first smaller value during startup when a large current inrush is expected and then may be set to a second larger value during operation.

The over current detector 132 may be used to disengage the load 140 when an over (e.g., peak, threshold current) current fault occurs or other fault condition is detected. The over current detector 132 may continuously monitor the current being delivered to the load 140. The over current detector 132 may include multiple levels of sensitivity to account for the changing current needs of the load 140. For example, the over current detector 132 may include a first level of sensitivity and a second level of sensitivity. The first level of sensitivity may be set initially to a low level of sensitivity to allow for inrush or startup current to be delivered to the load 140. For instance, the low level of sensitivity may be used to permit a large inrush of current during startup that would otherwise be impermissible with a higher level of sensitivity. The second level of sensitivity may be adjusted or set to a higher level of sensitivity to allow for close monitoring of the operating current. Multiple levels of sensitivity may be used to allow for the current needs of a load. The levels of sensitivity may be monitored on a time basis and may change as the current needs of the load change.

The over current detector 132 may monitor the current passing to the load 140, comparing it to a preset or threshold level. If the current passing to the load exceeds this level, either in a positive or negative direction, the over current detector 132 may disengage the load 140, preventing large fault currents from flowing throughout the electronic device 102. The over current detector 132 may disengage the load 140 before the over current damages the electronic device 102. In particular, this may prevent damage to the load controller apparatus 116 (e.g., semiconductor, MOSFET, TRIAC, transistor, solid state relay, etc.) and/or the wiring. For example, continuous monitoring for fault detection and a rapid response may be beneficial. Specifically, fault detection in accordance with the systems and methods disclosed herein may be fast enough to prevent large fault currents from flowing, protecting both a MOSFET (or other control device) as well as the wiring. Thus, the over current detector 132 may allow the electronic device 102 to recover from a complete short circuit of the load 140. The over current detector 132 may be implemented in continuous time hardware to decrease the response time when an over current fault occurs. For example, the over current detector 132 may be implemented by passing the continuous time current waveform from the gain variable buffer 134 to a windowed peak detector. In one configuration, the windowed peak detector may send an immediately disengage signal to the load controller apparatus 116 when the preset level is exceeded. Thus, the electronic device 102 may immediately disengage in response to an over current fault before the electronic device 102 is significantly damaged.

As described above, the gain of the gain variable buffer 134 may be dynamically adjusted to different values to compensate for known times when a large inrush of current is permissible (e.g., during the first few cycles of startup). The perceived current is based on the gain of the gain variable buffer 134. Thus, the gain variable buffer 134 may adjust the sensitivity of the over current detector 132 by setting different gain values. For instance, the gain of the gain variable buffer 134 may be set to a very low value for very low sensitivity during startup and then set to a normal value for normal sensitivity for monitoring and energy measurement during normal running condition. For example, on a tungsten load of 500 watts, the computing module 118 may program the gain variable buffer 134 with a low gain so that the over current detector 132 is set for a 42 amp trip point for the first 16 cycles of AC current during startup and then switched to a higher gain so that the over current detector 132 is set for a 10 amp trip point for normal running and energy measurement.

In some configurations, the electronic device 102 (e.g., current sensor 130 and/or gain variable buffer 134) may provide analog current measurements to an A/D converter to convert analog current measurements to digital samples (e.g., quantized samples that represent current measurements). For example, the A/D converter may sample at discrete intervals to capture how the current varies over time (e.g., one or more duty cycles of load drive signal A 144*a*). In some configurations, the A/D converter may sample the current waveform to correspond to the sampling of the voltage waveform. Depending on the impedance of the circuit (e.g., the electronic device 102 and the load 140), there may be a phase shift between the voltage waveform and the current waveform. The zero-cross detector 108 may allow the samplings of the voltage waveform and the current waveform to be aligned so that a phase margin may be determined.

The computing module 118 may generally manage and/or direct the operation of the electronic device 102. For example, a computing module 118 may include and/or be implemented as a microprocessor for controlling the electronic device 102. The computing module 118 may receive the (digital and/or quantized) voltage waveform, the (digital and/or quantized) current waveform and/or the output of the zero-cross detector 108. The computing module 118 may perform operations based on the voltage waveform, current waveform and/or zero-cross detector 108. For example, the computing module 118 may determine a phase margin between the voltage waveform and the current waveform. The phase margin may be determined by aligning the samples of the voltage waveform and the current waveform and determining the phase offset between the two waveforms. The computing module 118 may flexibly determine the phase margin whether the electronic device 102 is wired in switch-leg mode (e.g., series mode) or parallel mode (e.g., non-switch-leg mode). In switch-leg mode, for example, a cosine function may be utilized to determine the phase margin as opposed to the real power compared to the apparent power (in non-switch-leg mode, for example). The voltage waveform, current waveform and phase margin may then be used for other operations. The computing module 118 may include one or more of a load detector 120, a fault detector 124, an energy management module 126 and an inductive load control module 105.

The load detector 120 may determine the type of load 140 that is coupled to the electronic device 102 based on the impedance of the load 140. For example, if there is a phase margin with the voltage waveform leading the current waveform, then the load 140 has inductive impedance. If the there is a phase margin with the current waveform leading the voltage waveform, then the load 140 has capacitive impedance. If there is no phase margin or a small phase margin (e.g., less than a threshold phase margin) between the voltage waveform and the current waveform, then the load 140 has resistive impedance. By mapping the characteristics of the impedance, the load detector 120 may determine more specifically the type of the load 140. For example, the characteristics of the phase margin and/or voltage/current waveforms of a capacitive impedance may coincide with the characteristics of a load 140 of compact fluorescent lamps. The load detector 120 may determine the type of load 140 regardless of whether the electronic device 102 is wired in switch-leg mode or parallel mode. In parallel mode, for example, the load detector 120 may determine the type of load based on whether the current waveform leads or lags the voltage waveform and by the amount of phase margin (e.g., delay, phase offset) between the current waveform and voltage waveform. In switch-leg mode, for example, the load detector 120 may determine the type of load based on whether the current waveform leads or lags the voltage waveform and/or the amount of phase margin between the current waveform and voltage waveform.

The load detector 120 may adapt how the electronic device 102 drives the load based on the type of the load 140 (e.g., the type of impedance of the load). For example, the electronic device 102 may adjust the way it drives the load 140 (e.g., adjust the voltage waveform and/or current waveform) and/or adjust its own impedance to improve the efficiency for the circuit. For example, the electronic device 102 may switch off an inductive load at a particular time to avoid a reflection as described in greater detail below. Thus, the electronic device 102 may negotiate with the load to enhance the efficiency of the circuit and/or to avoid potential damage to the electronic device 102.

The fault detector 124 may disengage the load 140 to protect the electronic device 102 and/or the load 140 when the continuous current delivered to the load 140 is over a set threshold for a certain length of time. For example, the fault detector 124 may perform overload fault protection as described above.

It should be noted that the fault detector 124 and the over current detector 132 may be implemented in addition to or alternatively from each other and/or may coordinate operation. For example, one or more of the fault detector 124 and the over current detector 132 may be implemented. Additionally or alternatively, the fault detector 124 may be implemented in place of the over current detector 132 (e.g., the over-current detector 132 may instead be the fault detector 124) and/or vice-versa (e.g., the fault detector 124 may instead be the over-current detector 132). Additionally or alternatively, the over current detector 132 and the fault detector 124 may function in coordination with each other in some configurations.

The energy management module 126 may manage and/or report energy usage. For example, the voltage waveform, the current waveform and the phase margin may be used to more efficiently and effectively control a load 140 and/or to report the energy usage of the load 140. For example, the energy management module 126 may determine one or more of RMS voltage, RMS current, real power (in watts, for example), apparent power (in volt-amperes, for example) and power factor. The RMS voltage may be determined based on the voltage waveform. Similarly, the RMS current may be determined based on the current waveform. Real power in the circuit may be determined by multiplying the voltage waveform and the current waveform with an appropriate phase margin adjustment. Apparent power in the electrical circuit may be found by multiplying the RMS voltage and RMS current. The power factor may be determined by determining the ratio of real power (e.g., watts) and apparent power (e.g., volt-amperes). These values may be used to more efficiently and effectively drive the load 140. In addition, these values may be reported to an external electronic device (e.g., central controller, server, etc.).

The values determined by the energy management module 126 may be used to determine and report inconsistencies with the load 140. For example, if a known 500 watt load 140 of lighting is operating at only 400 watts, then the energy management block/module 126 may report a problem with the load 140 (e.g., one or more lights are burned out, there is a wiring problem, etc.). In another example, if a known 500 watt load 140 is operating at 600 watts, then the energy management module 126 may report a problem with the load 140 (e.g., wiring problem, malfunction, etc.). Thus, a user may be immediately alerted to inconsistencies in the load. Energy management values may additionally be reported so that energy usage may be monitored and adjusted by a user. For example, a user that receives reports of a 600 watt load of lighting may dim the lights to reduce the load to 500 watts. Thus, reporting the energy management values may enhance the energy usage of one or more loads 140.

The inductive load control module 105 may perform one or more operations for controlling inductive loads. When the load 140 is an inductive load, for example, the inductive load control module 105 may generate a switching signal or command that directs the controller module 114 to switch off the inductive load at a particular time. As described above, switching off an inductive load prematurely (based on the voltage waveform or zero-cross, for example) may result in a reflection from the load 140 that could damage the electronic device 102. For instance, prematurely switching off an inductive load may increase a rate of voltage change over time (e.g., dv/dt), which results in a charge of voltage reflected back from the load 140. More detail is given as follows.

As described above, the computing module 118 (e.g., the energy management module 126) may determine a power factor based on the voltage waveform and the current waveform. Furthermore, the computing module 118 (e.g., load detector 120) may determine a load type. The inductive load control module 105 may be utilized or activated when the computing module 118 determines that the load 140 is an inductive load. The inductive load control module 105 may determine a switching offset (for switching off the inductive load) based on the power factor. The switching offset may indicate an amount of time to delay switching off an inductive load after the voltage zero-cross. For example, the switching offset may be a time interval between the voltage zero-cross and an estimated current waveform zero-cross. By switching off the inductive load based on the estimated current waveform zero-cross, the electronic device may reduce or avoid a potentially damaging reflection from the load 140.

In some configurations, the inductive load control module 105 may utilize one or more mathematical algorithms and/or a look-up table to determine the switching offset based on the power factor. In particular, the inductive load control module 105 may estimate a current waveform zero-cross by applying the power factor to the one or more mathematical algorithms and/or the look-up table. Using the estimated current waveform zero-cross, the electronic device 102 may switch off current to the inductive load in a sinusoidal fashion (resulting in low rate dv/dt, for example).

The controller module 114 may control the amount of power delivered to the load 140. In one configuration (e.g., a switch configuration), the control module 114 may turn on (e.g., enable) the power or turn off (e.g., disable) the power to the load 140. In another configuration (e.g., a dimmer configuration), the control module 114 may adjust the amount of power that is delivered to the load 140 (e.g., enable, disable, adjust duty cycle, etc.). The controller module 114 may include a load controller apparatus 116 for switching and/or dimming the power delivered to the load 140. Examples of the load controller apparatus 116 include switches (e.g., mechanical relay, solid state relay, etc.) and dimmers (implemented with MOSFET(s), TRIAC(s) and/or transistor(s), etc.). The controller module 114 may include discrete components. In some configurations, the controller module 114 may only include discrete components.

When the load 140 is an inductive load, the controller module 114 may receive a switching signal or command from the computing module 118 (e.g., inductive load control module 105) that indicates timing for switching off the inductive load (e.g., switching off the line feed 101 to the inductive load). In some configurations, the switching signal may be a binary signal that activates/deactivates one or more MOSFETs to switch the line feed 101. For example, the computing module 118 may direct the controller module 114 to switch off the line feed 101 to the inductive load at a time that reduces or avoids reflected voltage from the load 140 based on the estimated current waveform zero-cross. Accordingly, the electronic device 102 may approximately align the phase of the duty cycle (e.g., switch off point) of load drive signal A 144*a* with the estimated current waveform zero cross. This may be performed by the electronic device 102, which can automatically drive other load types (e.g., capacitive and resistive) appropriately and/or which can be housed in a wall box 100. In some configurations, the electronic device 102 may additionally operate in either switch-leg or non-switch leg mode. More detail is given below.

The power module 112 may convert the AC feed line power to low voltage direct current power for powering components of the electronic device 102. The power module 112 may include discrete components. In some configurations, the power module 112 may only include discrete components.

The communication module 142 may be used to communicate with another electronic device (e.g., electronic device, central controller, server, keypad, etc.). The electronic device 102 may communicate over a wired and/or wireless channel. The electronic device 102 may receive data from another electronic device (e.g., control commands, operating parameters of the load, operating parameters of the electronic device, configuration settings, firmware updates, etc.). The electronic device 102 may transmit data to another electronic device (e.g., energy measurement values, fault conditions, status notifications, real-time operating data, etc.). For example, an electronic device 102 may receive operating parameters about a load 140. Another electronic device may communicate with the electronic device 102 that the load is a series of five 100 watt light bulbs. The other electronic device may also communicate to the electronic device 102 a schedule for operating the load 140 and/or the amount of power that should be delivered to the load 140. The electronic device 102 may operate according to the parameters received from the other electronic device. The energy management features may allow the electronic device 102 to report the energy measurement values and the operating conditions of the load and/or circuit. The electronic device 102 may additionally report inconsistencies with the circuit (e.g., detect a burnt out light bulb, wiring problem, electrical malfunction, power hazard, etc.). For example, the electronic device 102 may determine that the five 100 watt light bulbs are only drawing 400 watts of power, indicating a burnt out light.

The communication module 142 may optionally include auxiliary controls 146 and/or auxiliary indicators 148. The auxiliary controls 146 may be in communication with another electronic device and/or interface for receiving input to the electronic device 102. In one configuration, the auxiliary controls 146 may be coupled to or housed within an electronic device 102. The auxiliary controls 146 may interact with the computing module 118 to provide instructions on specific conditions about controlling the load 140 or performing energy management functions. The auxiliary indicators 148 provide a visual indication of conditions of the load 140. For example, the auxiliary indicators 148 may include LEDs that indicate whether a load is being properly driven by the electronic device 102. The auxiliary indicators 148 may also indicate whether a fault condition has been triggered and/or whether the load controller apparatus 116 is currently in an on or off position.

The power source 138 may output high voltage (e.g., 240, 120) AC. The high voltage AC may be coupled to the electronic device 102 through the line feed 101. The load 140 may be coupled to the electronic device 102 through load drive signal B 144b (e.g., the load drive output of the electronic device 102). The current detector 130 may be in line with the load drive signal 144a-b such that load current may be determined.

Figure 2:
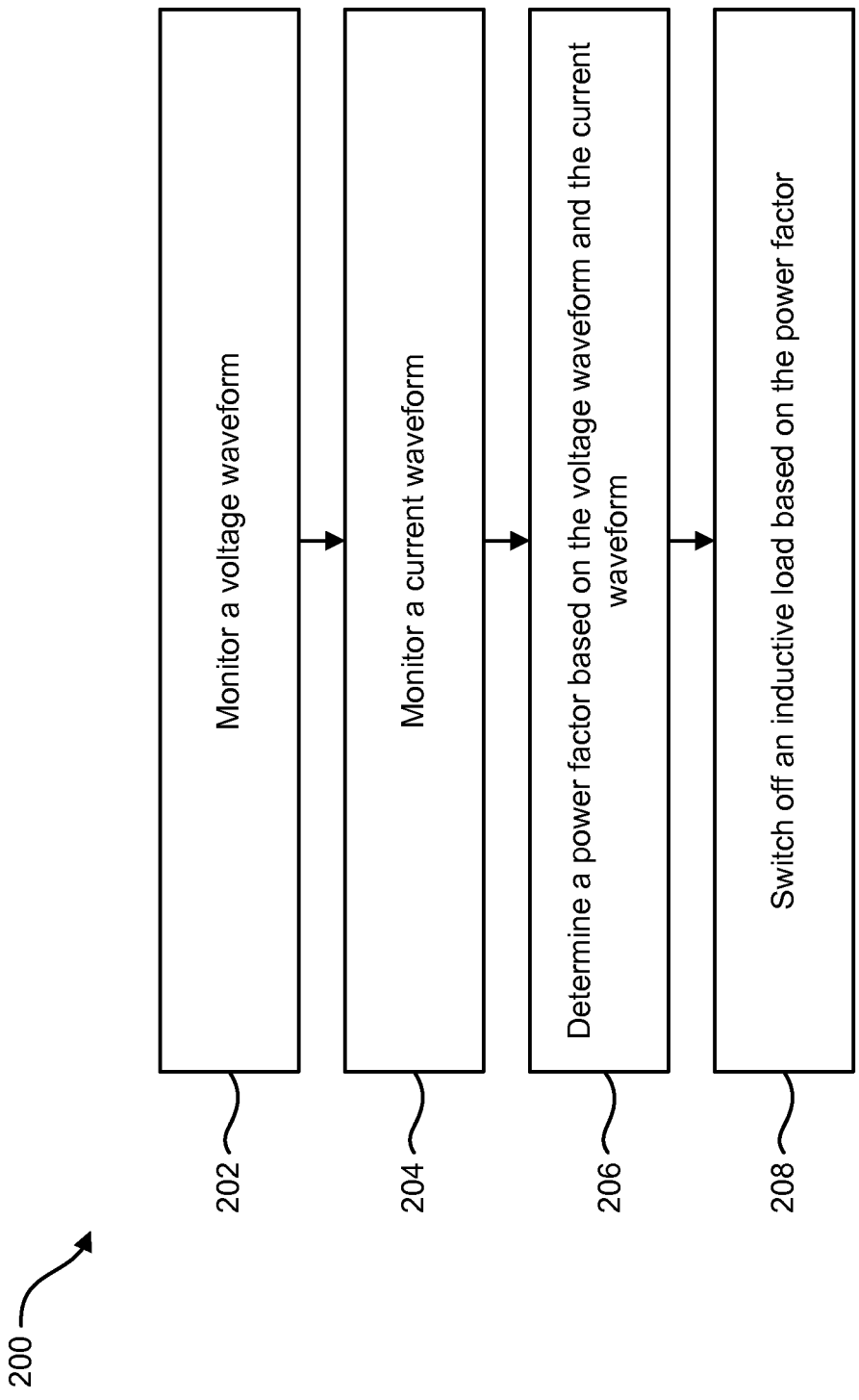
FIG. 2 is a flow diagram illustrating one configuration of a method for switching an inductive load by an electronic device.

FIG. 2 is a flow diagram illustrating one configuration of a method 200 for switching an inductive load by an electronic device 102. An electronic device 102 (e.g., voltage sensor module 104) may monitor 202 a voltage waveform. For example, the electronic device 102 may measure and/or capture the voltage of a line feed 101 as described above in connection with FIG. 1.

The electronic device 102 (e.g., current sensor module 128) may monitor 204 a current waveform. For example, the electronic device 102 may measure and/or capture the current of a load drive signal 144 as described above in connection with FIG. 1.

The electronic device 102 (e.g., computing module 118) may determine 206 a power factor based on the voltage waveform and the current waveform. In some configurations, the electronic device 102 may determine the power factor as follows. The electronic device 102 may square each sample of the voltage waveform in a time interval (e.g., one AC cycle), add the squared values to obtain a sum of the squared values, divide the sum by the number of samples to obtain a quotient and take the square root of the quotient to obtain an RMS voltage. It should be noted that other approaches to obtaining RMS voltage may be utilized (e.g., dividing a peak voltage value by $\sqrt{2}$). The electronic device 102 may similarly obtain RMS current by squaring each sample of the current waveform in a time interval, adding the squared values to obtain a sum of the squared values, dividing the sum by the number of samples to obtain a quotient and by taking the square root of the quotient to obtain the RMS current. It should be noted that other approaches to obtaining RMS current may be utilized (e.g., dividing a peak current value by $\sqrt{2}$). The electronic device may multiply the RMS voltage and RMS current to obtain an apparent power value. The electronic device 102 may obtain a real power value by multiplying aligned voltage and current waveforms. The electronic device 102 may accordingly determine the power factor dividing the real power value by the apparent power value.

The electronic device 102 (e.g., controller module 114) may switch off 208 an inductive load based on the power factor. When the load 140 is an inductive load, for example, the electronic device 102 (e.g., inductive load control module 105) may determine a switching offset (for switching off the inductive load) based on the power factor. The switching offset may indicate an amount of time to delay switching off an inductive load after a voltage zero-cross. The electronic device 102 (e.g., controller module 114) may then switch off 208 the inductive load based on the switching offset. In some configurations, the switching offset may be a time interval between the voltage zero-cross and an estimated current waveform zero-cross. By switching off the inductive load based on the estimated current waveform zero-cross, the electronic device may reduce or avoid a potentially damaging reflection from the load 140. The electronic device 102 may be capable of switching off 208 the inductive load as described, even when wired in switch-leg mode or parallel (e.g., non-switch leg) mode.

In some configurations, the electronic device 102 (e.g., computing module 118 or inductive load control module 105) may utilize one or more mathematical algorithms and/or a look-up table to determine the switching offset based on the power factor. In particular, the electronic device 102 (e.g., computing module 118 or inductive load control module 105) may estimate a current waveform zero-cross by applying the power factor to the one or more mathematical algorithms and/or the look-up table. Using the estimated current waveform zero-cross, the electronic device 102 may switch off the line feed 101 (to the inductive load) in a sinusoidal fashion (resulting in low rate dv/dt, for example).

Figure 3:
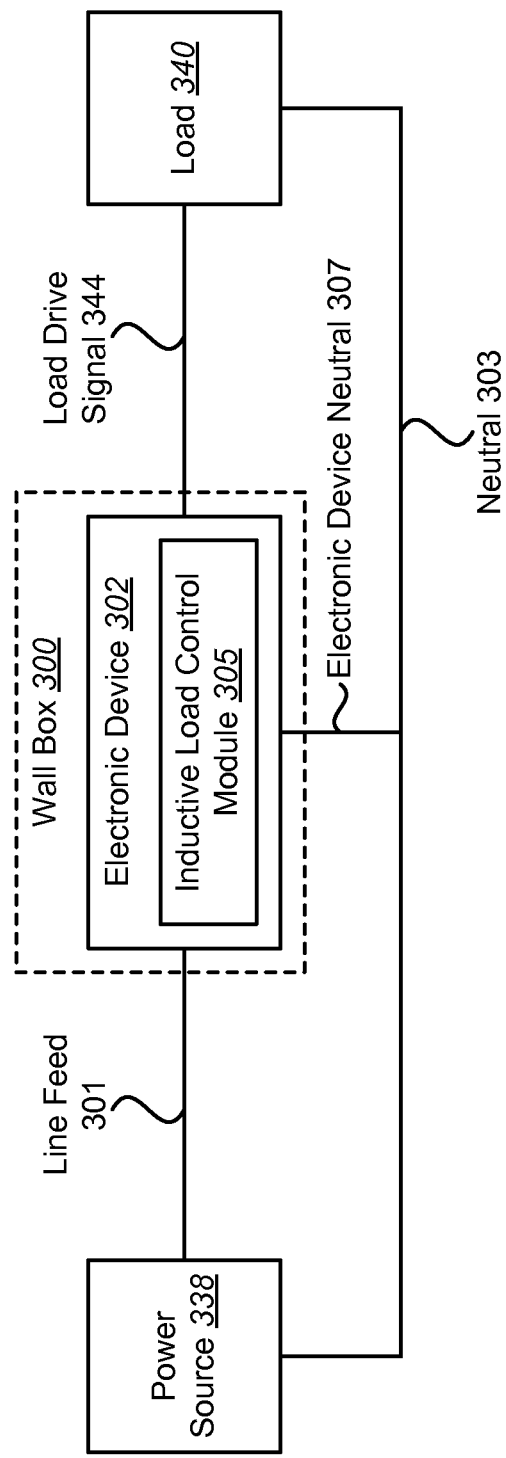
FIG. 3 is a block diagram illustrating one example of an electronic device wired in parallel mode or non-switch-leg mode.

FIG. 3 is a block diagram illustrating one example of an electronic device 302 wired in parallel mode or non-switch-leg mode. The electronic device 302 described in connection with FIG. 3 may be one example of the electronic device 102 described in connection with FIG. 1. In this example, a power source 338 (e.g., an electrical panel that provides mains electricity) is coupled to the electronic device 302 through a line feed 301. The line feed 301 may provide AC power to the electronic device 302. The electronic device 302 may utilize the line feed to power the electronic device 302 components as well as to drive the load 340. The electronic device 302 is coupled to a load 340 and provides a load drive signal 344 to the load 340. The load 340 is also coupled to the power source 338 through a neutral 303 or return line (e.g., mains neutral).

In parallel or non-switch-leg mode, the electronic device 302 is also coupled to the power source 338 through the neutral 303 or return line (e.g., mains neutral). For example, an electronic device neutral 307 is coupled to the power source 338 and the load 340 through a neutral 303. In other words, a neutral terminal of the electronic device 302 is coupled to the neutral 303 or return line.

As illustrated in this example, the electronic device 302 may have dimensions for fitting within a wall box 300. In some configurations, the electronic device 302 may include mounting (e.g., brackets, tabs, fastener ports, etc.) for integration with the wall box 300. The electronic device 302 may also include an inductive load control module 305. The inductive load control module 305 described in connection with FIG. 3 may be one example of the inductive load control module 105 described in connection with FIG. 1.

Figure 4:
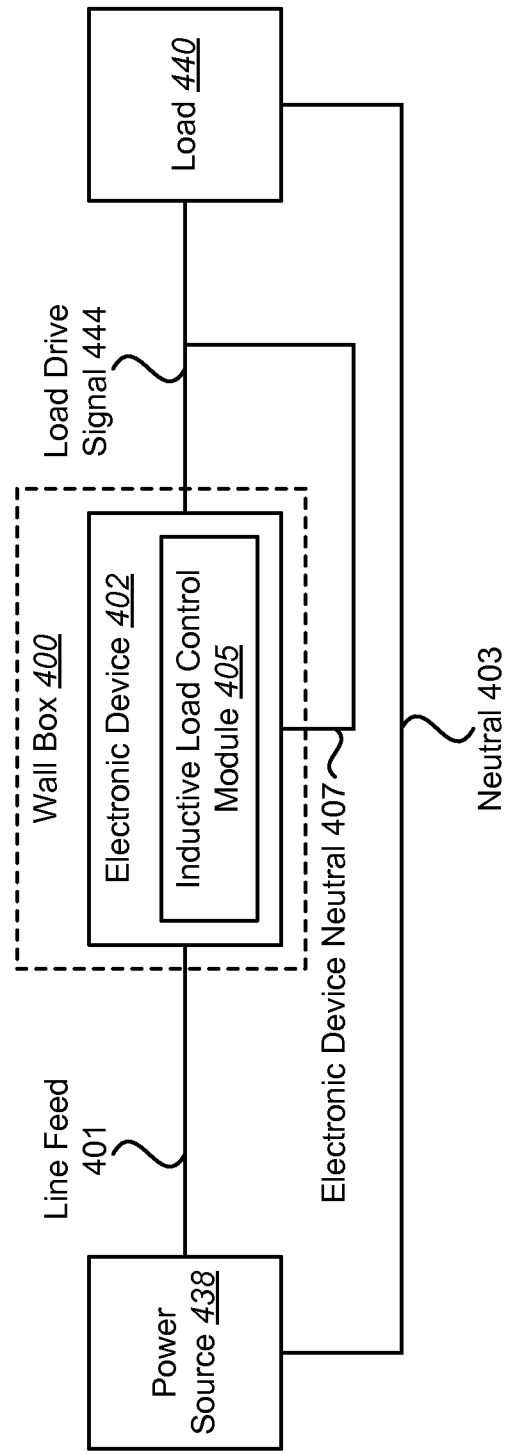
FIG. 4 is a block diagram illustrating one example of an electronic device wired in series mode or switch-leg mode.

FIG. 4 is a block diagram illustrating one example of an electronic device 402 wired in series mode or switch-leg mode. The electronic device 402 described in connection with FIG. 4 may be one example of the electronic device 102 described in connection with FIG. 1. In this example, a power source 438 (e.g., an electrical panel that provides mains electricity) is coupled to the electronic device 402 through a line feed 401. The line feed 401 may provide AC power to the electronic device 402. The electronic device 402 may utilize the line feed to power the electronic device 402 components as well as to drive the load 440. The electronic device 402 is coupled to a load 440 and provides a load drive signal 444 to the load 440. The load 440 is also coupled to the power source 438 through a neutral 403 or return line (e.g., mains neutral).

In series or switch-leg mode, an electronic device neutral 407 is also coupled to the load 440 through the load drive output that provides the load drive signal 444. In other words, a neutral terminal of the electronic device 402 is not coupled to the neutral 403 or return line.

As illustrated in this example, the electronic device 402 may have dimensions for fitting within a wall box 400. In some configurations, the electronic device 402 may include mounting (e.g., brackets, tabs, fastener ports, etc.) for integration with the wall box 400. The electronic device 402 may also include an inductive load control module 405. The inductive load control module 405 described in connection with FIG. 4 may be one example of the inductive load control module 105 described in connection with FIG. 1.

It should be noted that the current and voltage waveforms may differ significantly depending on whether the electronic device 102 is wired in a switch-leg mode (as illustrated in FIG. 4) or a non-switch-leg mode (as illustrated in FIG. 3). In a switch-leg mode (also referred to as series mode), the electronic device 402 may be wired into a circuit without a neutral 403. For example, the line feed 401 (e.g., hot lead) from a power source 438 (e.g., electrical panel) may be coupled to one lead of the electronic device 402 and the electronic device neutral 407 lead and load lead (that provides the load drive signal 444) of the electronic device 402 may be coupled to the load 440. In this case, the electronic device 102 may be powered using the return to the load 440.

In some configurations, it may be common to have wiring situations where a neutral wire is not available at the location where the electronic device 102 will be installed (e.g., the wall box 400). In these situations, the electronic device 102 may not be powered in parallel with the hot and neutral alternating current (AC) wires but in series with the hot and load wires. These may be the situations in which the electronic device 102 is wired in switch-leg mode. Switch-leg mode may present some difficulties in accurately measuring one or more quantities (e.g., power factor). However, the systems and methods disclosed herein may utilize a phase angle between a voltage waveform and current waveform to provide a more accurate measurement in switch-leg mode as opposed to a real versus apparent power ratio in a non-switch-leg mode.

Figure 5:
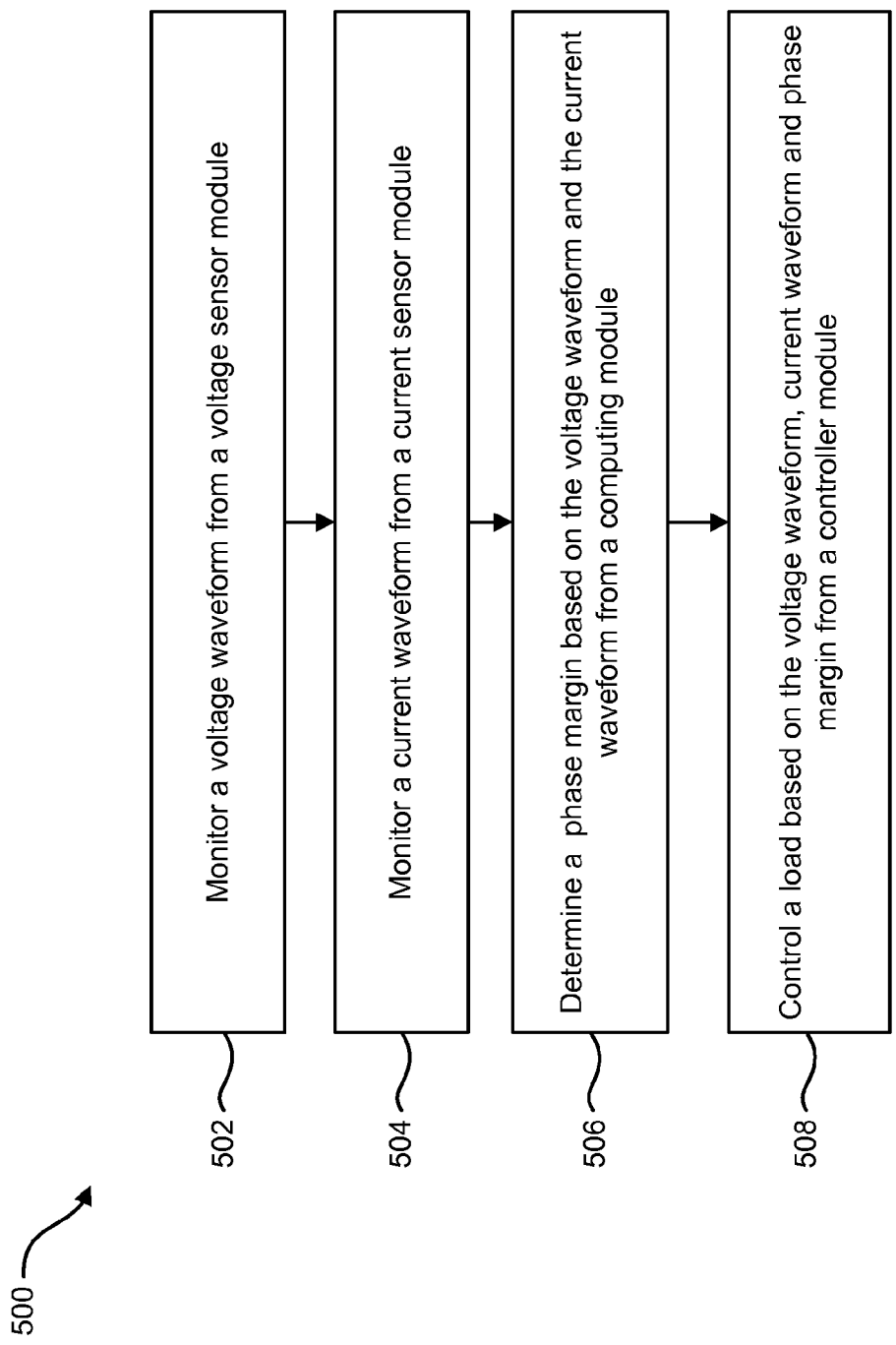
FIG. 5 is a flow diagram illustrating one configuration of a method for managing energy with an electronic device.

FIG. 5 is a flow diagram illustrating one configuration of a method 500 for managing energy with an electronic device. An electronic device 102 may monitor 502 a voltage waveform from a voltage sensor module 104. The voltage sensor module 104 may be implemented in the electronic device 102. For instance, the voltage sensor module 104 may sample a continuous time voltage waveform to determine parameters of the signal and to determine how the signal varies over time. The voltage sensor module 104 may include discrete components.

The electronic device 102 may monitor 504 a current waveform from a current sensor module 128. The current sensor module 128 may be implemented in the electronic device 102. For instance, the current sensor module 128 may sample a continuous time current waveform to determine parameters of the signal and to determine how the signal varies over time. The current sensor module 128 may include discrete components.

The electronic device 102 may determine 506 a phase margin based on the voltage waveform and the current waveform from a computing module 118. The computing module 118 may be implemented in the electronic device 102. For instance, a computing module 118 may align corresponding time samples of the voltage waveform and the current waveform to determine the difference in the phase (e.g., phase offset, phase angle) between the voltage waveform and the current waveform. A zero-cross detector 108 may be used to time the sampling and for aligning the sampled values. If the peaks and zeros of the current waveform correspond to the timing of the peaks and zeros of the voltage waveform, then there would be a zero phase margin between the angles. If the voltage waveform leads the current waveform, then the phase margin will be the offset angle between the two waveforms. This may occur with inductive impedance. If the current waveform leads the voltage waveform, then the phase margin will be the offset angle between the two waveforms. This may occur with capacitive impedance. Determining the phase margin allows the actual power to be determined. The computing module 118 may be coupled to the voltage sensor module 104 and the current sensor module 128.

The electronic device 102 may control 508 a load 140 based on the voltage waveform, current waveform and phase margin from a controller module 114. The controller module 114 may be implemented in the electronic device 102. For instance, the electronic device 102 may change the way the controller module 114 drives the load 140 based on the impedance of the load 140 and the power at which load 140 is operating. Switching off an inductive load as described above may be one example of controlling 508 a load 140. The controller module 114 may include discrete components.

In some implementations, one or more of the voltage sensor module 104, current sensor module 128, computing module 118 and controller module 114 may include discrete components. In some configurations, one or more of the voltage sensor module 104, current sensor module 128, computing module 118 and controller module 114 may only include discrete components. The use of discrete components may be beneficial for allowing certain components of the electronic device 102 to be housed within a wall box 100. In some configurations, the electronic device 102 may be completely housed within a wall box 100.

Figure 6:
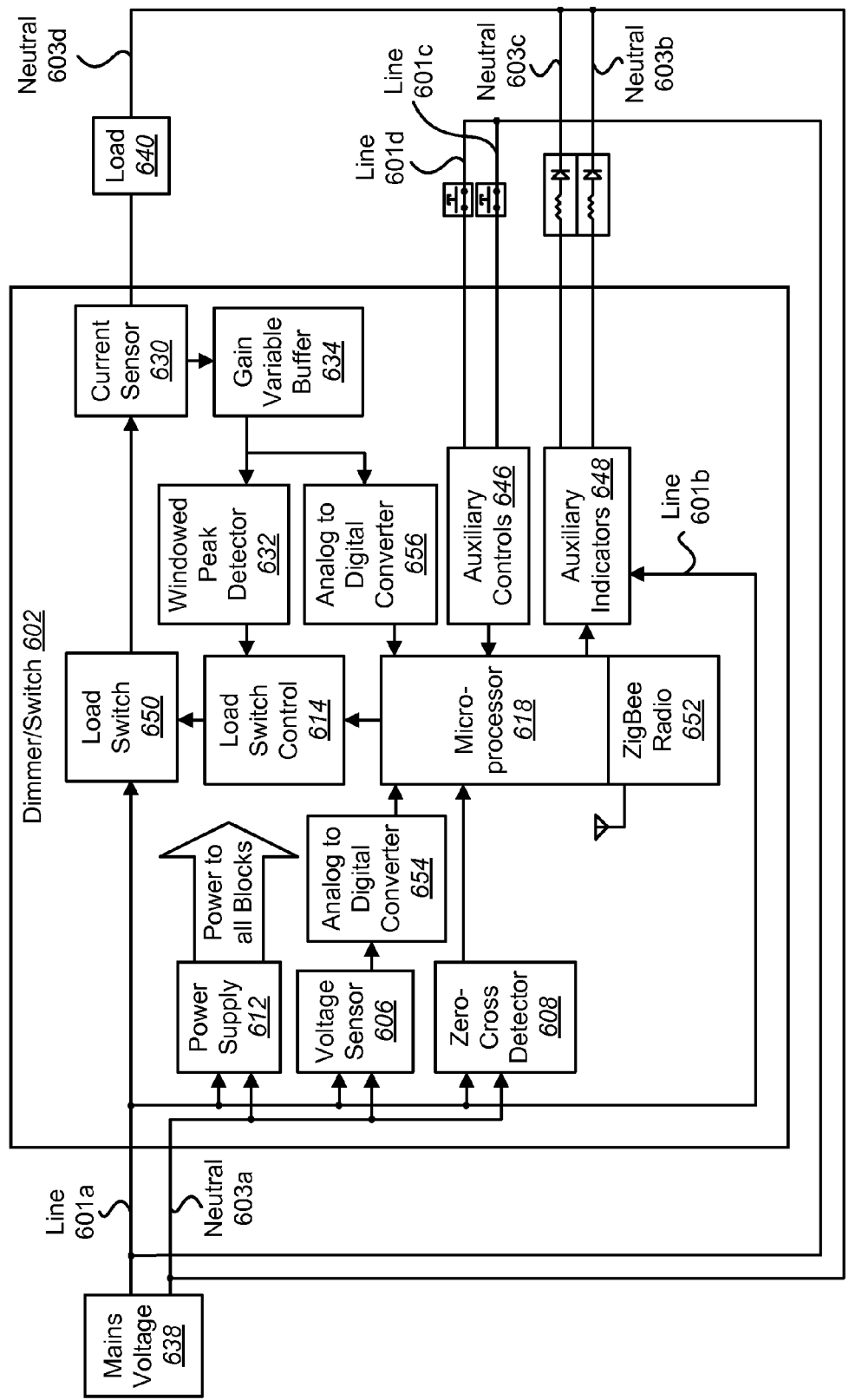
FIG. 6 is a block diagram illustrating one configuration of a dimmer/switch in which systems and methods for managing energy may be implemented.

FIG. 6 is a block diagram illustrating one configuration of a dimmer/switch 602 in which systems and methods for managing energy may be implemented. The dimmer/switch 602 of FIG. 6 may be one example of the electronic device 102 described above in connection with FIG. 1. In some configurations, one or more of the elements described in connection with FIG. 6 may be configured with similar functionality to corresponding elements described in connection with FIG. 1.

The dimmer/switch 602 may receive a voltage waveform from a mains voltage 638. The dimmer/switch 602 may also include an internal power supply 612 coupled to the mains voltage 638 that provides power to each module/block within the dimmer/switch 602. The mains voltage 638 may provide power to the dimmer/switch 602 via a line 601a-d coupled to a load switch 650, a power supply 612, a voltage sensor 606, a zero-cross detector 608, auxiliary indicators 648 and auxiliary controls 646. The mains voltage 638 may also be coupled to the power supply 612, the voltage sensor 606, the zero-cross detector 608, the auxiliary indicators 648 and a load 640 via a neutral line 603a-d. The neutral line 603a-d may be a return line for different modules/blocks within the dimmer/switch 602 providing a return to a ground reference voltage.

The dimmer/switch 602 may include a microprocessor 618. The microprocessor 618 may include some or all of the components of the computing module 118 described above in connection with FIG. 1. The microprocessor 618 may include or be coupled to a ZigBee radio 652. The ZigBee radio 652 may be used for communicating with other electronic devices. The voltage sensor 606 may be coupled to the microprocessor 618 via an A/D converter 654. The current sensor 630 may be coupled to the microprocessor 618 via a second A/D converter 656. The current sensor 630 may also be coupled to a gain variable buffer 634. The gain variable buffer 634 may be coupled to a windowed peak detector 632 and the second A/D converter 656. In some configurations, the A/D converters 654, 656 are part of the microprocessor 618. The microprocessor 618 may also be coupled to the zero-cross detector 608, the auxiliary controls 646 and the auxiliary indicators 648. The microprocessor 618 may also be coupled to the load switch 650 for engaging or disengaging the load 640 via instruction from a load switch control 614. It should be noted that the dimmer/switch 602 described in connection with FIG. 6 is illustrated as being wired in parallel mode as described in connection with FIG. 3. However, the dimmer/switch 602 may alternatively be wired in switch-leg mode (e.g., series mode) as described above in connection with FIG. 4.

Figure 7:
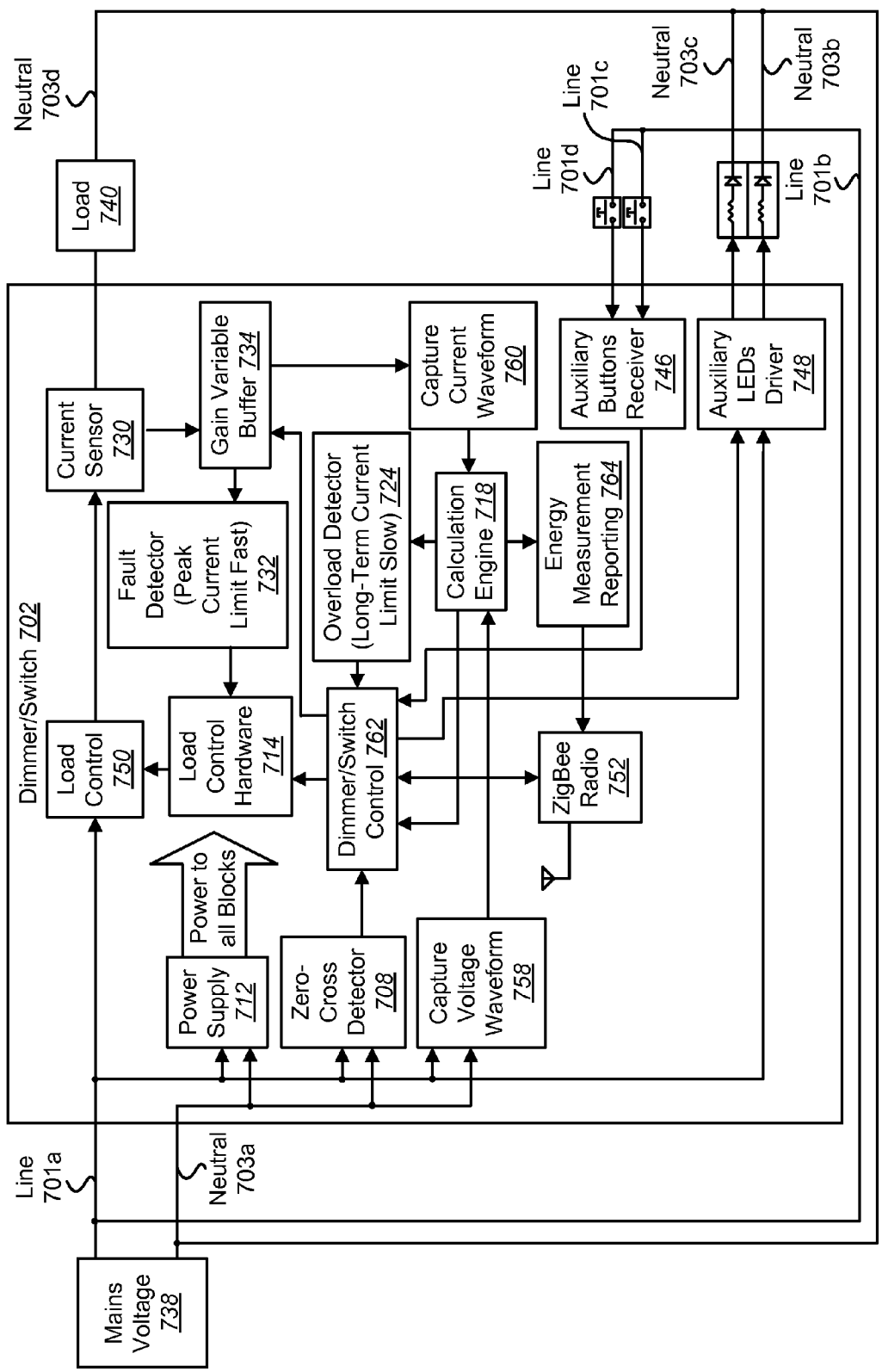
FIG. 7 is a block diagram illustrating another configuration of a dimmer/switch in which systems and methods for managing energy may be implemented.

FIG. 7 is a block diagram illustrating another configuration of a dimmer/switch 702 in which systems and methods for managing energy may be implemented. The dimmer/switch 702 may be one example of the electronic device 102 and/or the dimmer/switch 602 described above in connection with FIG. 1 and FIG. 6. In some configurations, one or more of the elements described in connection with FIG. 7 may be configured with similar functionality to corresponding elements described in connection with FIG. 1 and/or FIG. 6.

The dimmer/switch 702 may receive a voltage waveform from a mains voltage 738. The dimmer/switch 702 may also include an internal power supply 712 coupled to the mains voltage 738 that provides power to each module/block within the dimmer/switch 702. The mains voltage 738 may provide power to the dimmer/switch 702 via a line 701a-d coupled to a load control 750, a power supply 712, a zero-cross detector 708, a capture voltage waveform block 758, auxiliary buttons receiver 746 and an auxiliary LEDs driver 748. The mains voltage 738 may also be coupled to the power supply 712, zero-cross detector 708, capture voltage waveform block 758, auxiliary LEDs driver 748 and the load 740 via a neutral line 703a-d. The neutral line 703a-d may be a return line for different modules/blocks within the dimmer/switch 702 providing a return to a ground reference voltage. The dimmer/switch 702 may also include a load control 750 coupled to a load control hardware 714 and a current sensor 730. The load control hardware 714 may be coupled to a fault detector 732 (e.g., peak current limit fast) and a microprocessor. The fault detector 732 may be coupled to a gain variable buffer 734. The gain variable buffer 734 may be coupled to the current sensor 730 and the microprocessor. Moreover, each of the power supply 712, zero-cross detector 708, capture voltage waveform block 758, auxiliary LEDs driver 748 and auxiliary buttons receiver 746 may be coupled to a microprocessor housed within the dimmer/switch 702.

Many of the components shown on the dimmer/switch 702 of FIG. 7 may be implemented within a microprocessor, which may be an example of the computing module 118 described in connection with FIG. 1 and/or of the microprocessor 618 described in connection with FIG. 6. For example, the microprocessor may include a dimmer/switch control 762, an overload detector 724 (e.g., long-term current limit slow), a calculation engine 718, a capture current waveform block 760, an energy measurement reporting block 764 and a ZigBee radio 752. Some or all of these components may be housed within the microprocessor and coupled to other modules/blocks within the dimmer/switch 702. For example, the dimmer/switch control 762 may be coupled to the zero-cross detector 708, the load control hardware 714, the gain variable buffer 734, the ZigBee radio 752, the auxiliary LEDs driver 748 and the auxiliary buttons receiver 746. The overload detector 724 may be coupled to the calculation engine 718. The calculation engine 718 may be coupled to the capture voltage waveform block 758, the capture current waveform block 760, the dimmer/switch control 762 and the energy measurement reporting block 764. In some configurations, the calculation engine 718 may determine a power factor and may provide a command to the dimmer/switch control 762 to switch off an inductive load as described above. For example, the calculation engine 718 may provide a switching offset or otherwise indicate timing for switching off an inductive load. The dimmer/switch control 762 may then manipulate the load control hardware 714 and/or load control 750 in order to switch off an inductive load to reduce or avoid a reflection from the load 740. The energy measurement reporting block 764 may be coupled to the ZigBee radio 752. It should be noted that the dimmer/switch 702 described in connection with FIG. 7 is illustrated as being wired in parallel mode as described in connection with FIG. 3. However, the dimmer/switch 702 may alternatively be wired in switch-leg mode (e.g., series mode) as described above in connection with FIG. 4.

Figure 8:
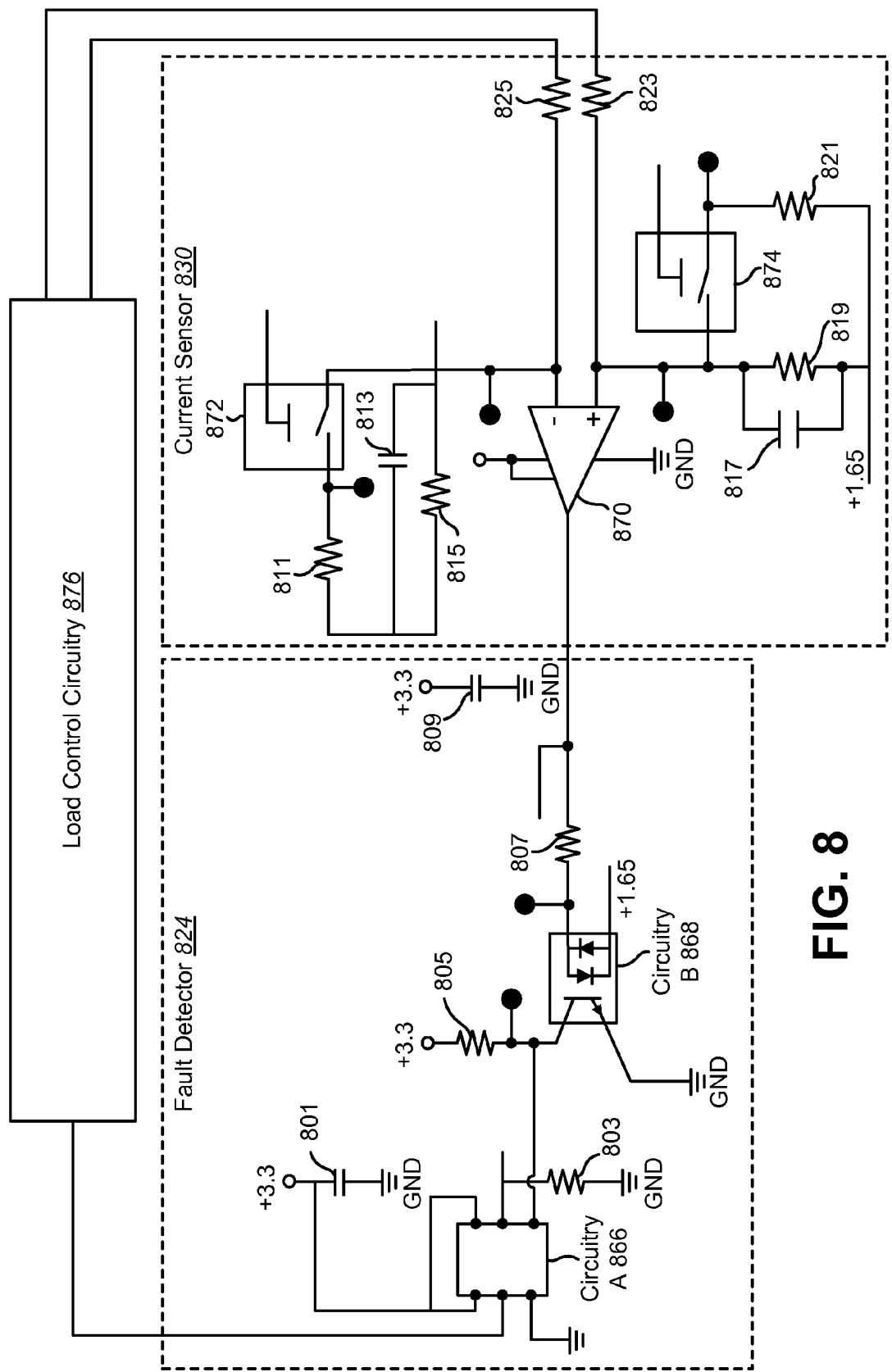
FIG. 8 is a circuit diagram illustrating one configuration of an electronic device for managing energy.

FIG. 8 is a circuit diagram illustrating one configuration of an electronic device for managing energy. The circuit may be one configuration of components found within the electronic devices 102, 602, 702 described above in connection with FIGS. 1, 6 and 7. The electronic device 102 may include circuitry A 866, circuitry B 868 and an amplifier 870. It should be noted that one or more of the various circuitries described herein may be implemented in chip packages. Circuitry A 866, circuitry B 868 and the amplifier 870 may be implemented as part a fault detector 824 and current sensor 830. The fault detector 824 and current sensor 830 may be implemented within the computing module 118 and/or the current sensor module 128. Circuitry A 866, circuitry B 868 and the amplifier 870 may also detect other fault conditions, such as current exceeding one or multiple levels of threshold current passing through the electronic device 102 in order to determine whether load control circuitry 876 should engage or disengage operation of a load 140. The electronic device 102 may also include load control circuitry 876 for controlling and/or managing a load 140. The load control circuitry 876 may include circuitry for driving a switch (e.g., mechanical relay). The load control circuitry 876 may also include circuitry for driving a dimmer (e.g., solid state semiconductor).

The current sensor 830 may also include a first analog switch 872 and a second analog switch 874. The analog switches 872, 874 may be used to control a threshold value of current flowing through the electronic device 102. For example, a specific load 140 may have an inrush current and settling time specifications that indicate different levels of current that may safely flow through the electronic device 102 at a given time of operation. The analog switches 872, 874 may be used to modify a threshold value based on an appropriate amount of current that should be allowed to pass through the electronic device 102. The analog switches 872, 874 may be adjusted multiple times during operation of a load 140 to adjust for current variations. Further, the analog switches 872, 874 may assist the current sensor module 128 and the computing module 118 in determining whether a current exceeds a threshold value and determining whether to engage or disengage the load 140 to protect components within the electronic device 102. In some configurations, the electronic device 102 may include additional analog switches for implementing detection of additional threshold current values.

The circuit of FIG. 8 also shows one configuration of resistors, capacitors and other discrete components that may be implemented within the electronic device 102. For example, a first pin of circuitry A 866 may be coupled to a supply voltage and a capacitor 801 coupled to ground. A second pin of circuitry A 866 may be coupled to the load control circuitry 876. A third pin of circuitry A 866 may be coupled to ground. A fourth pin of circuitry A 866 may be coupled to a resistor 805 that is coupled to a supply voltage and a first pin of circuitry B 868. A fifth pin of circuitry A 866 may be coupled to a resistor 803 that is coupled to ground. The sixth pin of circuitry A 866 may be fed back to the first pin of circuitry A 866. The configuration of the resistors, capacitors and other discrete components may also include a capacitor 809 coupled between a supply voltage and a ground reference.

Circuitry B 868 may include one or more diodes and a transistor within the packaging of circuitry B 868. As described above, the first pin of circuitry B 868 may be coupled to a resistor 805 that is coupled to a supply voltage. A second pin of circuitry B 868 may be coupled to ground. A third pin of circuitry B 868 may be coupled to a reference voltage between the ground and the supply voltage. A fourth pin of circuitry B 868 may be coupled to a resistor 807 and to other components within the electronic device 102. The resistor 807 may be coupled to an output of the amplifier 870 as well as being coupled to other components within the electronic device 102.

The amplifier 870 may be coupled to a supply voltage and to ground. As described above, the output of the amplifier 870 may be coupled to the resistor 807 as well as being coupled to other components within the electronic device 102. The negative input of the amplifier 870 may be coupled to a resistor 825 which is coupled to the load control circuitry 876. The negative input of the amplifier 870 may also be coupled to other components within the electronic device 102. The negative input of the amplifier 870 may also be coupled to a resistor 815 and a capacitor 813 in parallel. The negative input of the amplifier 870 may also be coupled to a first analog switch 872 connected to a resistor 811 and other components within the wireless device 102. The first analog switch 872 and the resistor 811 may be in parallel to the capacitor 813 and the resistor 815. The positive input of the amplifier 870 may be coupled to a resistor 823 which is coupled to the load control circuitry 876. The positive input of the amplifier 870 may be coupled to other components within the electronic device 102. The positive input of the amplifier 870 may also be coupled to a capacitor 817 and a resistor 819 in parallel. The positive input of the amplifier 870 may also be coupled to a second analog switch 874 which is coupled to a resistor 821. The second analog switch 874 and the resistor 821 may be in parallel to the resistor 819 and the capacitor 817. The capacitor 817, resistor 819 and resistor 821 may be coupled to a reference voltage between the supply voltage and the ground.

Figure 9:
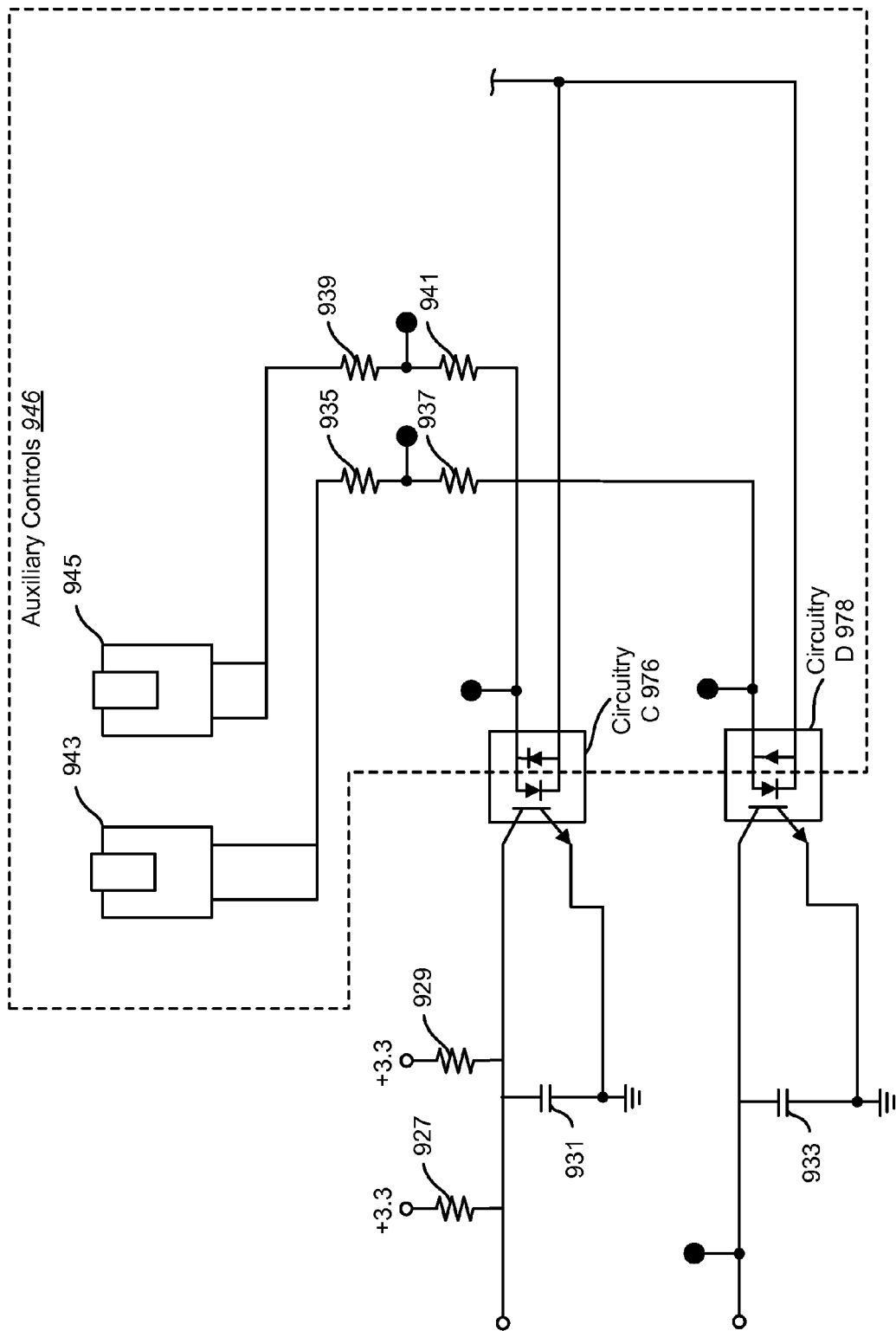
FIG. 9 is a circuit diagram illustrating one configuration of auxiliary controls that may be implemented in an electronic device.

FIG. 9 is a circuit diagram illustrating one configuration of auxiliary controls 946 that may be implemented in an electronic device. The auxiliary controls 946 may be one configuration of the auxiliary controls 146 described above in connection to FIG. 1. The auxiliary controls 946 may include circuitry C 976 and circuitry D 978. Circuitry C 976 and circuitry D 978 are chips that include discrete components. In one configuration, circuitry C 976 and circuitry D 978 include a transistor and diodes implemented within a packaging. A first pin of circuitry C 976 may be coupled to a resistor 929 and a capacitor 931. The resistor 929 may be coupled to a supply voltage. The capacitor 931 may be coupled to ground and a second pin of circuitry C 976. A third pin of circuitry C 976 may be coupled to a return line. A fourth pin of circuitry C 976 may be coupled to other components within the electronic device 102. The fourth pin of circuitry C 976 may also be coupled to a resistor 941. The resistor 941 may be coupled to other components within the electronic device 102 and a resistor 939. The resistor 939 may be coupled to a first screw terminal 945.

A first pin of circuitry D 978 may be coupled to a capacitor 933 and a resistor 927. The first pin may also be coupled to other components of the electronic device 102. The resistor 927 may be coupled to a supply voltage. The capacitor 933 may be coupled to ground and a second pin of circuitry D 978. A third pin of circuitry D 978 may be coupled to a return line. A fourth pin of circuitry D 978 may be coupled to other components within the electronic device 102. The fourth pin of circuitry D 978 may also be coupled to a resistor 937. The resistor 937 may be coupled to other components within the electronic device 102 and a resistor 935. The resistor may be coupled to a second screw terminal 943.

Figure 10:
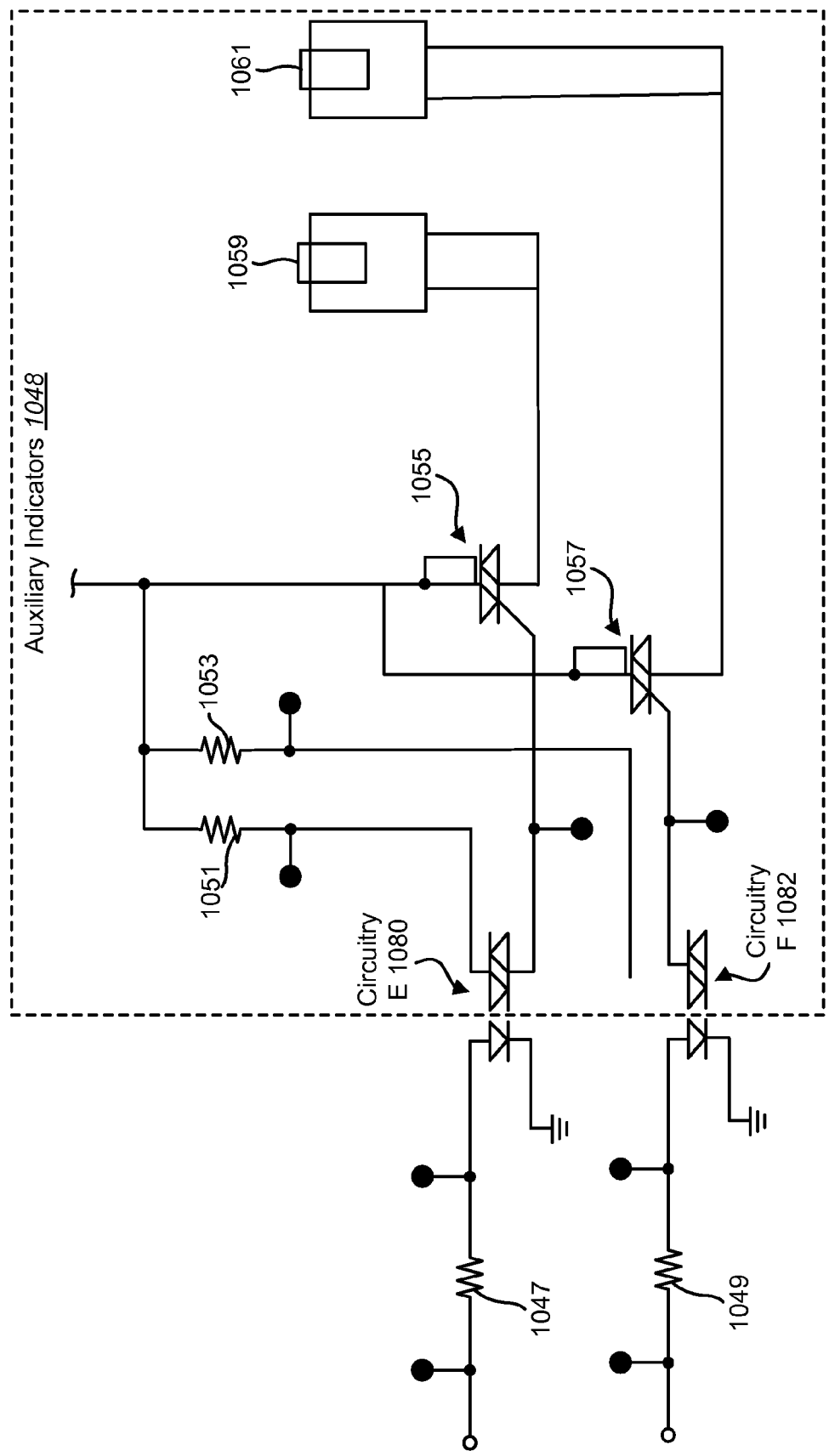
FIG. 10 is a circuit diagram illustrating one configuration of auxiliary indicators that may be implemented in an electronic device.

FIG. 10 is a circuit diagram illustrating one configuration of auxiliary indicators 1048 that may be implemented in an electronic device 102. The auxiliary indicators 1048 may be one configuration of the auxiliary indicators 148 described above in connection to FIG. 1. The auxiliary indicators 1048 may include circuitry E 1080 and circuitry F 1082. Circuitry E 1080 and circuitry F 1082 are chips that include discrete components. In one configuration, the discrete components of circuitry E 1080 and circuitry F 1082 are housed within a packaging. A first pin of circuitry E 1080 may be coupled to other components within the electronic device 102. The first pin may also be coupled to a resistor 1047 which is coupled to other components within the electronic device 102. A second pin of circuitry E 1080 may be coupled to ground. A third pin of circuitry E 1080 may be coupled to other components within the electronic device 102 and a transistor 1055. The transistor 1055 may be coupled to the line voltage. The transistor 1055 may also be coupled to a first screw terminal 1059. The transistor 1055 may also be coupled to another transistor 1057. A fourth pin of circuitry E 1080 may be coupled to other components within the electronic device 102 and a resistor 1051. The resistor 1051 may be coupled to a resistor 1053 and a line voltage.

A first pin of circuitry F 1082 may be coupled to other components within the electronic device 102. The first pin may also be coupled to a resistor 1049. A second pin of circuitry F 1082 may be coupled to ground. A third pin of circuitry F 1082 may be coupled to other components within the electronic device 102 and the transistor 1057. The transistor 1057 may be coupled to a second screw terminal 1061. A fourth pin of circuitry F 1082 may be coupled to the resistor 1053 coupled to the line voltage.

Figure 11:
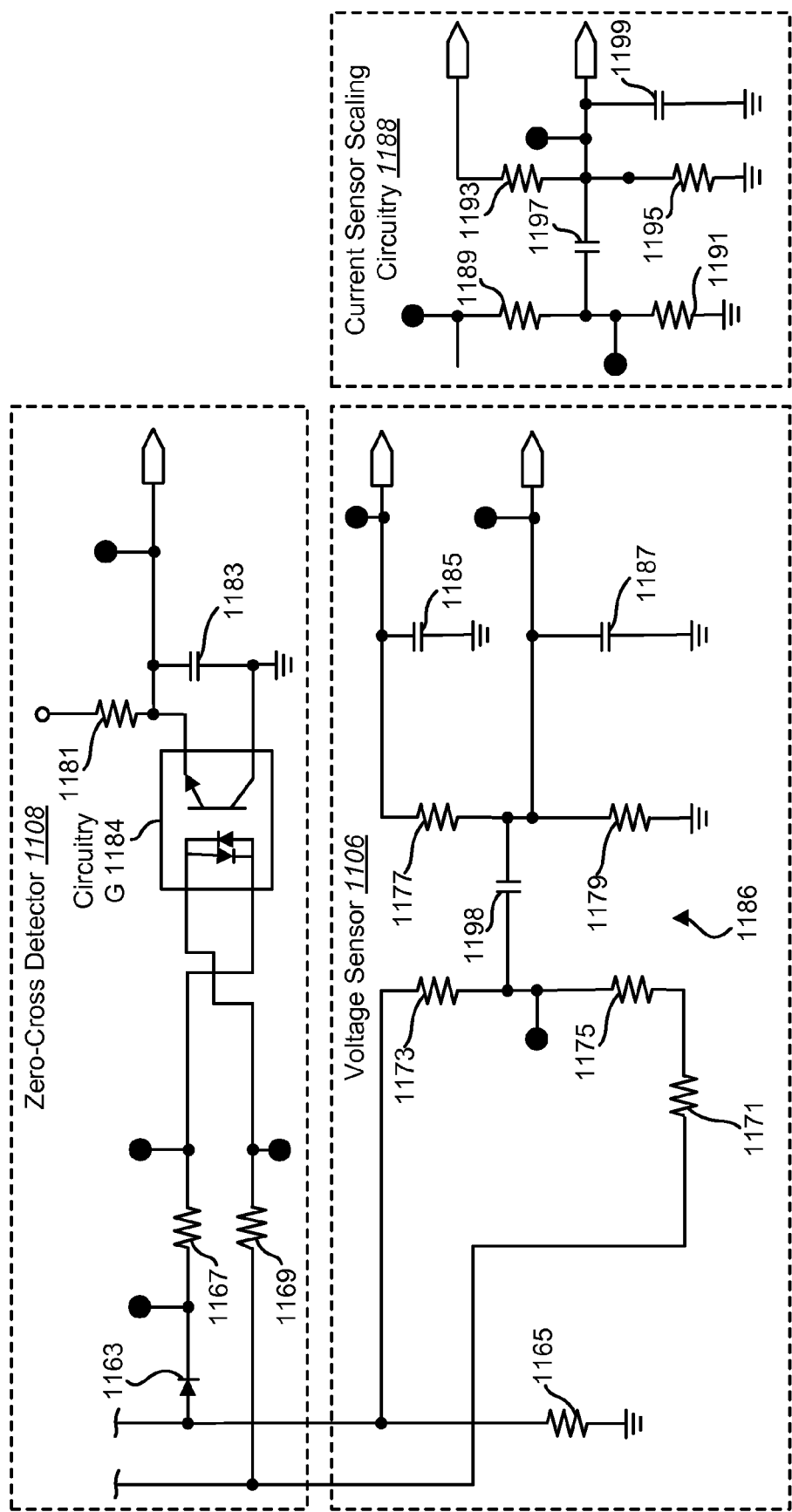
FIG. 11 is a circuit diagram illustrating one configuration of circuitry that may be implemented in the voltage sensor module and the current sensor module.

FIG. 11 is a circuit diagram illustrating one configuration of circuitry that may be implemented in the voltage sensor module 104 and the current sensor module 128. In one configuration, the electronic device 102 may include circuitry G 1184 and other circuitry to implement a zero-cross detector 1108. The zero-cross detector 1108 may be one configuration of the zero-cross detector 108 described above in connection with FIG. 1. A first pin of circuitry G 1184 may be coupled to other components within the electronic device 102 and a resistor 1169. The resistor 1169 may be coupled to a return line and a resistor 1171. A second pin of circuitry G 1184 may be coupled to other components within the electronic device 102 and a resistor 1167. The resistor 1167 may be coupled to other components within the electronic device 102 and to an output of a diode 1163. The input of the diode 1163 may be coupled to a line voltage. A third pin of circuitry G 1184 may be coupled to a capacitor 1183 and ground. A fourth pin of circuitry G 1184 may be coupled to a resistor 1181, the capacitor 1183 and other component within the electronic device 102. The resistor 1181 may be coupled to a supply voltage. The capacitor 1183 may be coupled to ground and the third port of circuitry G 1184.

In some configurations, the voltage sensor module 104 may include circuitry to implement a voltage sensor 1106. For instance, the voltage sensor 1106 illustrated in FIG. 11 may be one example of and/or may provide similar elements and functionality of the voltage sensor 106 described above in connection to FIG. 1. The voltage sensor 1106 may include a network of resistors 1186 for scaling a voltage (e.g., mains voltage, power supply). The network of resistors 1186 may include a first resistor 1173, second resistor 1175, third resistor 1177 and fourth resistor 1179. The first resistor 1173 may be coupled to the second resistor 1175 and other components within the electronic device 102. The third resistor 1177 may be coupled to the fourth resistor 1179. The first resistor 1173 may be coupled to a line voltage and a resistor 1165 that is coupled to ground. The second resistor 1175 may be coupled to a resistor 1171 that is coupled to a return line. The third resistor 1177 may be coupled to a capacitor 1185 and other components within the electronic device 102. The capacitor 1185 may be coupled to ground. The fourth resistor 1179 may be coupled to a capacitor 1187 and other components within the electronic device 102. The capacitor 1187 may be coupled to ground. Each of the first resistor 1173, second resistor 1175, third resistor 1177 and fourth resistor 1179 may be coupled to each other via a capacitor 1198.

In some configurations, the current sensor module 128 may also include circuitry to implement current sensor scaling circuitry 1188 as illustrated in FIG. 11. The current sensor scaling circuitry 1188 may be implemented in one configuration of the current sensor module 128 described above in connection to FIG. 1. For example, the current sensor scaling circuitry 1188 may interface between a current sensor and a microprocessor. The current sensor scaling circuitry 1188 may include a network of resistors for scaling a current. The network of resistors may include a first resistor 1189, second resistor 1191, third resistor 1193 and fourth resistor 1195. The first resistor 1189 may be coupled to other components within the electronic device 102. The first resistor 1189 may also be coupled to the second resistor 1191. The second resistor 1191 may be coupled to ground. The third resistor 1193 may be coupled to voltage reference. The third resistor 1193 may also be coupled to the fourth resistor 1195 and to other components within the electronic device 102. The fourth resistor 1195 may be coupled in parallel to a capacitor 1199 and a current reference. The resistor 1195 and capacitor 1199 may each be coupled to ground. Each of the first resistor 1189, second resistor 1191, third resistor 1193 and fourth resistor 1195 may be coupled together via a capacitor 1197.

Figure 12:
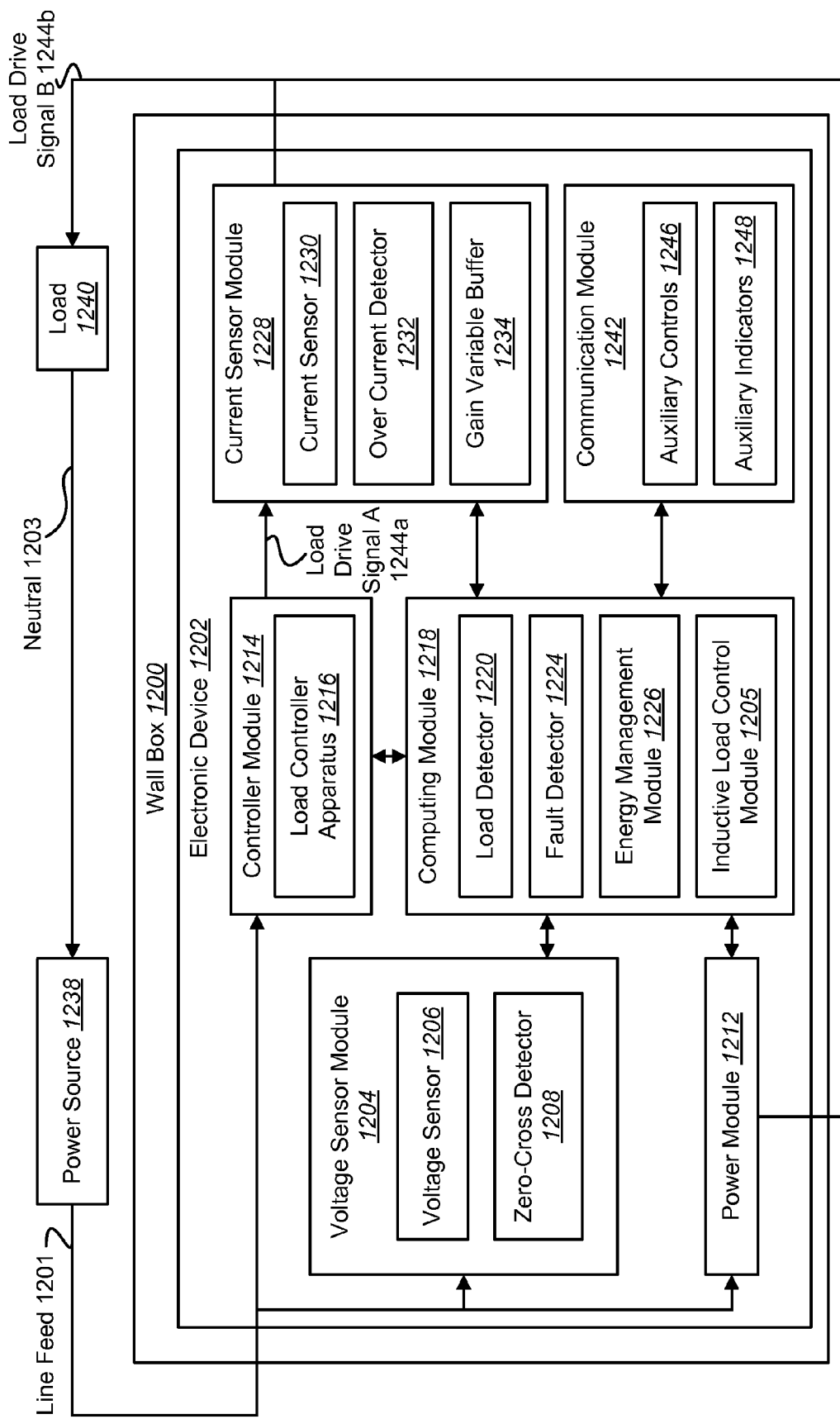
FIG. 12 is a block diagram illustrating one implementation of an electronic device for managing the energy usage of a load.

FIG. 12 is a block diagram illustrating one implementation of an electronic device 1202 for managing the energy usage of a load 1240. The wall box 1200 and the electronic device 1202 may be one configuration of the wall box 100 and electronic device 102 described above in connection with FIG. 1. One or more of the elements described in connection with FIG. 12 may function and/or be implemented similar to corresponding elements described in connection with FIG. 1. The electronic device 1202 includes one or more of a voltage sensor module 1204, a current sensor module 1228, a computing module 1218, a power module 1212, a controller module 1214 and a communication module 1242. The voltage sensor module 1204 may include a voltage sensor 1206 and/or a zero-cross detector 1208. The controller module 1214 may include a load controller apparatus 1216. The computing module 1218 may include a load detector 1220, a fault detector 1224, an energy management module 1226 and/or an inductive load control module 1205. The current sensor module 1228 may include a current sensor 1230, an over current detector 1232 and/or a gain variable buffer 1234. The communication module 1242 may optionally include auxiliary controls 1246 and/or auxiliary indicators 1248. The electronic device 1202 may be housed within a wall box 1200.

The electronic device 1202 may be coupled to a load 1240 with a load drive output that provides a load drive signal B 1244*b* to the load 1240. The load 1240 may be coupled to a power source 1238 via a neutral 1203 or return line (e.g., mains neutral). The power source 1238 may be coupled to the electronic device 1202 via a line feed 1201. The power source 1238 may also be coupled to the voltage sensor module 1204 and the power module 1212 via the line feed 1201. The controller module 1214 may provide load drive signal A 1244*a* to the current sensor module 1228.

In the example illustrated in FIG. 12, the electronic device 1202 is wired in switch-leg mode or series mode. In particular, an electronic device neutral 1207 may be coupled to the load drive output of the electronic device 1202 that provides load drive signal B 1244*b* to the load 1240. It should be noted that the electronic device neutral 1207 may be coupled to the power module 1212 and/or to one or more of the modules, components and/or elements of the electronic device 1202. In particular, the electronic device 1202 may utilize the electronic device neutral 1207 as a reference for one or more of the modules, components and/or elements of the electronic device 1202 (which may be coupled to the electronic device neutral 1207, for example).

Figure 13:
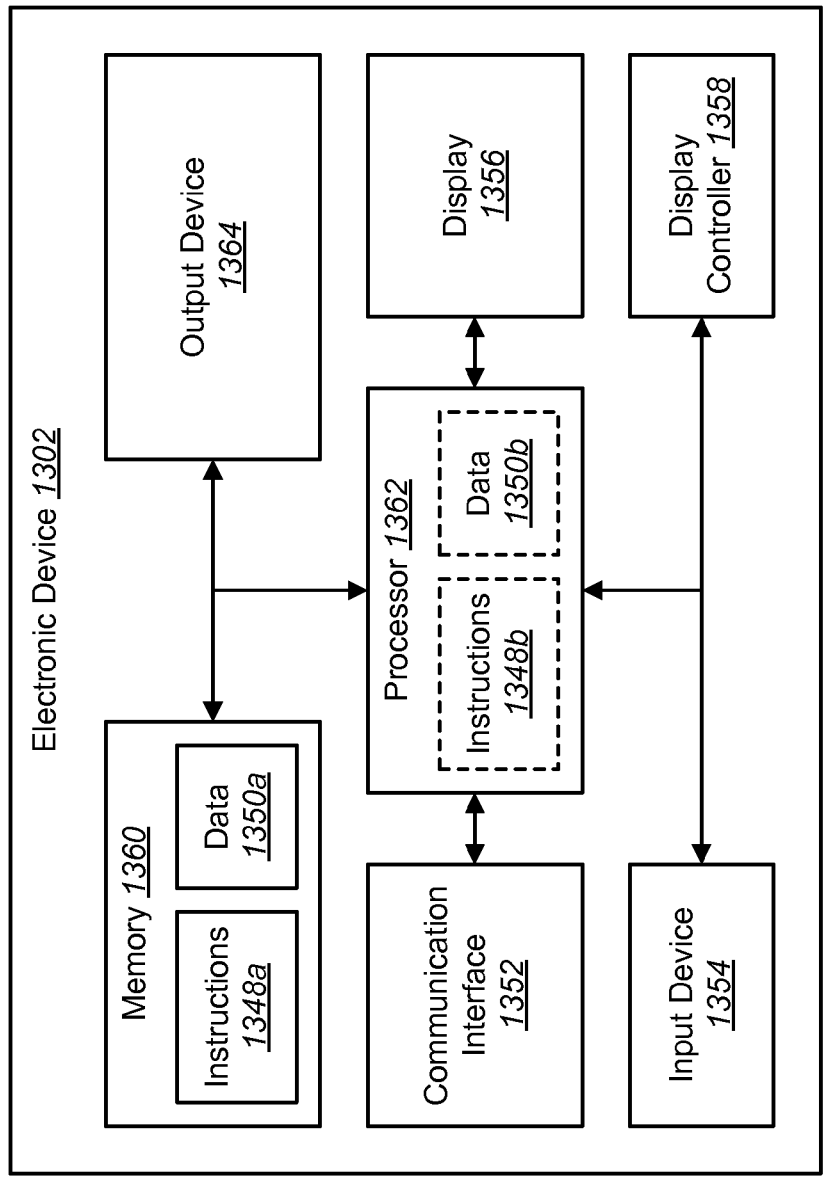
FIG. 13 illustrates various components that may be utilized on an electronic device.

FIG. 13 illustrates various components that may be utilized on an electronic device 1302. One or more of the electronic devices 102, 302, 402, 602, 702 and 1202 described previously may be configured similar to the electronic device 1302 illustrated in FIG. 13. For example, the electronic device 1302 may be configured to perform one or more of the methods 200, 500 described above. The electronic device 1302 may include a memory 1360, a communication interface 1352, an input device 1354, a processor 1362, an output device 1364, a display 1356 and a display controller 1358. The memory

1360 may store instructions 1348*a* and data 1350*a*. The processor 1362 may operate on instructions 1348*b* and data 1350*b*.

The term "discrete circuit" refers to an electronic circuit built out of discrete components. Examples of discrete components include resistors, capacitors, inductors, transformers, transistors, etc. In some configurations, a discrete circuit may not be a solid state integrated circuit that performs all of the functions described herein. However, a discrete circuit may include one or more discrete components contained in the same packaging (e.g., TRIAC, bridge rectifier, solid state relay, etc.). In some configurations, a discrete circuit made from discrete components refers to a circuit having separate components or circuits that perform individual finite functions. For instance, examples of a discrete circuit may include the voltage sensor module 104, controller module 114, computing module 118 and current sensor module 128 that may perform separate and discrete functions while being implemented within an electronic device 102 within a wall box 100. Moreover, each module within the electronic device 102 may include discrete components or discrete circuits within each module. In some instances, the term "circuit" may refer to a circuit in its entirety, for example, including the impedance of the electronic device and the impedance of the load.

As used herein, the term "coupled" and other variations thereof may mean that one element is connected to another element directly or indirectly. For example, if a first element is coupled to a second element, the first element may be connected directly to the second element or may be connected to the second element through another element.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. A computer-readable medium may be non-transitory and tangible. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device for inductive load switching, comprising:
    a voltage sensor module that monitors a voltage waveform;
    a current sensor module that monitors a current waveform;
    a computing module coupled to the voltage sensor module and to the current sensor module that:
        determines a power factor based on the voltage waveform and the current waveform, and
        determines a switching offset based on the power factor; and
    a controller module coupled to the computing module that switches off an inductive load based on the power factor and the switching offset, wherein the electronic device has dimensions for fitting within a wall box.

2. The electronic device of claim 1, wherein the switching offset indicates an amount of time to delay switching off an inductive load after a voltage zero-cross.

3. The electronic device of claim 1, wherein the electronic device is wired in a switch-leg mode.

4. The electronic device of claim 1, wherein the electronic device is wired in a parallel mode.

5. The electronic device of claim 1, wherein switching off the inductive load comprises switching off a line feed in a sinusoidal fashion.

6. The electronic device of claim 1, wherein the computing module estimates a current waveform zero-cross.

7. The electronic device of claim 1, wherein one or more of the voltage sensor module, current sensor module and controller module comprise discrete components.

8. The electronic device of claim 1, wherein the computing module determines the switching offset based on the power factor utilizing a look-up table.

9. The electronic device of claim 1, wherein the switching offset is a time interval between a voltage zero-cross and an estimated current waveform zero-cross.

10. A method for inductive load switching by an electronic device, comprising:
- monitoring a voltage waveform;
- monitoring a current waveform;
- determining a power factor based on the voltage waveform and the current waveform;
- determining a switching offset based on the power factor; and
- switching off an inductive load based on the power factor and the switching offset, wherein the electronic device has dimensions for fitting within a wall box.

11. The method of claim 10, wherein the switching offset indicates an amount of time to delay switching off an inductive load after a voltage zero-cross.

12. The method of claim 10, wherein the electronic device is wired in a switch-leg mode.

13. The method of claim 10, wherein the electronic device is wired in a parallel mode.

14. The method of claim 10, wherein switching off the inductive load comprises switching off a line feed in a sinusoidal fashion.

15. The method of claim 10, wherein the computing module estimates a current waveform zero-cross.

16. The method of claim 10, wherein the electronic device comprises one or more of a voltage sensor module, current sensor module and controller module, and wherein one or more of the voltage sensor module, current sensor module and controller module comprise discrete components.

17. A non-transitory tangible computer-readable medium for inductive load switching by an electronic device, comprising executable instructions for:
- monitoring a voltage waveform;
- monitoring a current waveform;
- determining a power factor based on the voltage waveform and the current waveform;
- determining a switching offset based on the power factor; and
- switching off an inductive load based on the power factor and the switching offset, wherein the electronic device has dimensions for fitting within a wall box.

* * * * *